(12) United States Patent
Labella et al.

(10) Patent No.: US 12,504,550 B2
(45) Date of Patent: Dec. 23, 2025

(54) TAPERED SCINTILLATOR CRYSTAL MODULES AND METHODS OF USING THE SAME

(71) Applicant: THE RESEARCH FOUNDATION FOR THE STATE UNIVERSITY OF NEW YORK, Albany, NY (US)

(72) Inventors: Andrew Labella, Stony Brook, NY (US); Amirhossein Goldan, Stony Brook, NY (US); Xinjie Cao, Stony Brook, NY (US); Wei Zhao, East Setauket, NY (US)

(73) Assignee: THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 203 days.

(21) Appl. No.: 18/024,357

(22) PCT Filed: Sep. 2, 2021

(86) PCT No.: PCT/US2021/048880
§ 371 (c)(1),
(2) Date: Mar. 2, 2023

(87) PCT Pub. No.: WO2022/051506
PCT Pub. Date: Mar. 10, 2022

(65) Prior Publication Data
US 2023/0314635 A1 Oct. 5, 2023

Related U.S. Application Data

(60) Provisional application No. 63/073,785, filed on Sep. 2, 2020.

(51) Int. Cl.
*G01T 1/20* (2006.01)
*G01T 1/29* (2006.01)

(52) U.S. Cl.
CPC ...... *G01T 1/20181* (2020.05); *G01T 1/20185* (2020.05); *G01T 1/20187* (2020.05); *G01T 1/2985* (2013.01); *G01T 1/20186* (2020.05)

(58) Field of Classification Search
CPC ............... G01T 1/20185; G01T 1/2985; G01T 1/20181; G01T 1/20187
See application file for complete search history.

(56) References Cited

U.S. PATENT DOCUMENTS 4,942,302 A 7/1990 Koechner
4,947,412 A 8/1990 Mattson
(Continued)

FOREIGN PATENT DOCUMENTS

CA 3086757 A1 8/2020
CN 102455432 B 11/2014
(Continued)

OTHER PUBLICATIONS

International Search Report dated Nov. 30, 2021 issued in PCT/US2021/048880.
(Continued)

*Primary Examiner* — Hugh Maupin
(74) *Attorney, Agent, or Firm* — Scully, Scott, Murphy & Presser, P.C.

(57) ABSTRACT

Tapered scintillator modules and detection devices having tapered scintillator modules in at least the end that contacts an optical sensor where the taper depends on the location of the scintillator module within the active area of the optical sensor is provided. Tapering of the scintillator modules may be close to the interface between the optical sensor and the module to minimize light leak to neighboring pixels at the interface while still allowing the detection device to retain high geometric efficiency and sensitivity to incident gamma rays since the distal end may not be tapered, which has a (Continued)

highest probability for gamma ray interaction based on Beer-Lambert law for photoelectric absorption.

25 Claims, 19 Drawing Sheets

(56) References Cited

U.S. PATENT DOCUMENTS

| | | | |
|---|---|---|---|
| 5,430,298 | A | 7/1995 | Possin et al. |
| 6,167,110 | A | 12/2000 | Possin et al. |
| 6,979,826 | B2 | 12/2005 | Ikhlef |
| 8,188,439 | B2 | 5/2012 | Gagnon et al. |
| 8,357,903 | B2 | 1/2013 | Wang et al. |
| 8,420,433 | B2 | 4/2013 | Jackson et al. |
| 8,669,513 | B2 | 3/2014 | Hughes et al. |
| 8,907,291 | B2 | 12/2014 | Burr et al. |
| 9,000,382 | B2 | 4/2015 | Mattson et al. |
| 9,031,195 | B2 | 5/2015 | Ashokan et al. |
| 9,075,151 | B2 | 7/2015 | Rose et al. |
| 9,423,511 | B2 | 8/2016 | Frach et al. |
| 9,568,623 | B2* | 2/2017 | Sahu ............... G01T 3/06 |
| 9,638,811 | B2 | 5/2017 | Iltis |
| 9,952,336 | B2 | 4/2018 | Yang et al. |
| 9,995,830 | B2 | 6/2018 | Schulz |
| 10,261,201 | B2 | 4/2019 | Fu et al. |
| 11,255,982 | B2 | 2/2022 | McLaughlin, II |
| 2003/0173522 | A1 | 9/2003 | Spartiotis |
| 2004/0012689 | A1 | 1/2004 | Tinnerino et al. |
| 2004/0105524 | A1 | 6/2004 | Ren et al. |
| 2006/0124854 | A1 | 6/2006 | Shah |
| 2008/0277588 | A1 | 11/2008 | Zeitler et al. |
| 2011/0007873 | A1* | 1/2011 | Rudin ............... H04N 25/41 378/62 |
| 2012/0068076 | A1 | 3/2012 | Daghighian |
| 2012/0153174 | A1 | 6/2012 | Tredwell |
| 2012/0153175 | A1 | 6/2012 | Tredwell |
| 2013/0299707 | A1* | 11/2013 | Levin ............... G01T 1/1642 250/363.03 |
| 2014/0091223 | A1* | 4/2014 | Menge ............... G01T 1/2006 250/366 |
| 2014/0138548 | A1* | 5/2014 | Li ............... G01T 1/1644 250/366 |
| 2014/0231655 | A1 | 8/2014 | Dueppenbecker et al. |
| 2015/0247934 | A1 | 9/2015 | Toyama et al. |
| 2016/0116605 | A1 | 4/2016 | Frisch et al. |
| 2016/0139280 | A1 | 5/2016 | Sahu et al. |
| 2016/0202361 | A1* | 7/2016 | Xie ............... G01T 1/20187 250/366 |
| 2017/0329024 | A1 | 11/2017 | Yang et al. |
| 2018/0203134 | A1 | 7/2018 | Chappo et al. |
| 2020/0326434 | A1 | 10/2020 | Goldan et al. |
| 2020/0363543 | A1 | 11/2020 | Wang et al. |
| 2021/0165114 | A1 | 6/2021 | Wimmers et al. |
| 2021/0396891 | A1 | 12/2021 | Jacobs et al. |
| 2022/0260730 | A1 | 8/2022 | Kim et al. |
| 2023/0063565 | A1 | 3/2023 | Ahnen et al. |
| 2023/0358901 | A1 | 11/2023 | Labella et al. |
| 2023/0375731 | A1 | 11/2023 | Labella et al. |

FOREIGN PATENT DOCUMENTS

| | | |
|---|---|---|
| CN | 105044758 A | 11/2015 |
| CN | 106461792 A | 2/2017 |
| CN | 109188500 B | 5/2020 |
| CN | 113167912 A | 7/2021 |
| CN | 115153600 A | 10/2022 |
| CN | 116261427 A | 6/2023 |
| CN | 116419714 A | 7/2023 |
| EP | 0973048 B1 | 6/2007 |
| EP | 2162762 B1 | 6/2016 |
| EP | 3196607 A1 | 7/2017 |
| EP | 1525492 B1 | 3/2018 |
| EP | 3399342 A1 | 11/2018 |
| JP | H0511060 A | 1/1993 |
| JP | 2001153958 A | 6/2001 |
| JP | 2004061516 A | 2/2004 |
| JP | 3549945 B2 | 8/2004 |
| JP | 4518759 B2 | 8/2010 |
| JP | 2010535409 A | 11/2010 |
| JP | 2012242397 A | 12/2012 |
| JP | 2012251996 A | 12/2012 |
| JP | 2013542415 A | 11/2013 |
| JP | 5632221 B2 | 11/2014 |
| JP | 2016537640 A | 12/2016 |
| JP | 6057207 B2 | 1/2017 |
| JP | 6062144 B2 | 1/2017 |
| JP | 6212501 B2 | 10/2017 |
| JP | 6274464 B2 | 2/2018 |
| JP | 6407875 B2 | 10/2018 |
| JP | 2019514008 A | 5/2019 |
| JP | 6775033 B2 | 10/2020 |
| JP | 2022511442 A | 1/2022 |
| JP | 7018106 B2 | 2/2022 |
| JP | 7185041 B2 | 12/2022 |
| KR | 101088057 B1 | 11/2011 |
| KR | 20160001254 A | 1/2016 |
| KR | 102103577 B1 | 4/2020 |
| KR | 20230041307 A | 3/2023 |
| WO | 2014014074 A1 | 1/2014 |
| WO | 2014072648 A1 | 5/2014 |
| WO | 2020146475 A1 | 7/2020 |
| WO | 2020168205 A1 | 8/2020 |
| WO | 2020193283 A1 | 10/2020 |
| WO | 2022051579 A1 | 3/2022 |
| WO | 2022076643 A1 | 4/2022 |

OTHER PUBLICATIONS

Written Opinion dated Nov. 30, 2021 issued in PCT/US2021/048880.

Extended European search report dated Sep. 2, 2024 received in European Patent Application No. 21865116.4.

First Office Action dated May 30, 2025 received in Chinese Patent Application No. 202180053975.9.

Notice of Reasons for Rejection dated Jul. 1, 2025 received in Japanese Patent Application No. 2023-514463.

\* cited by examiner

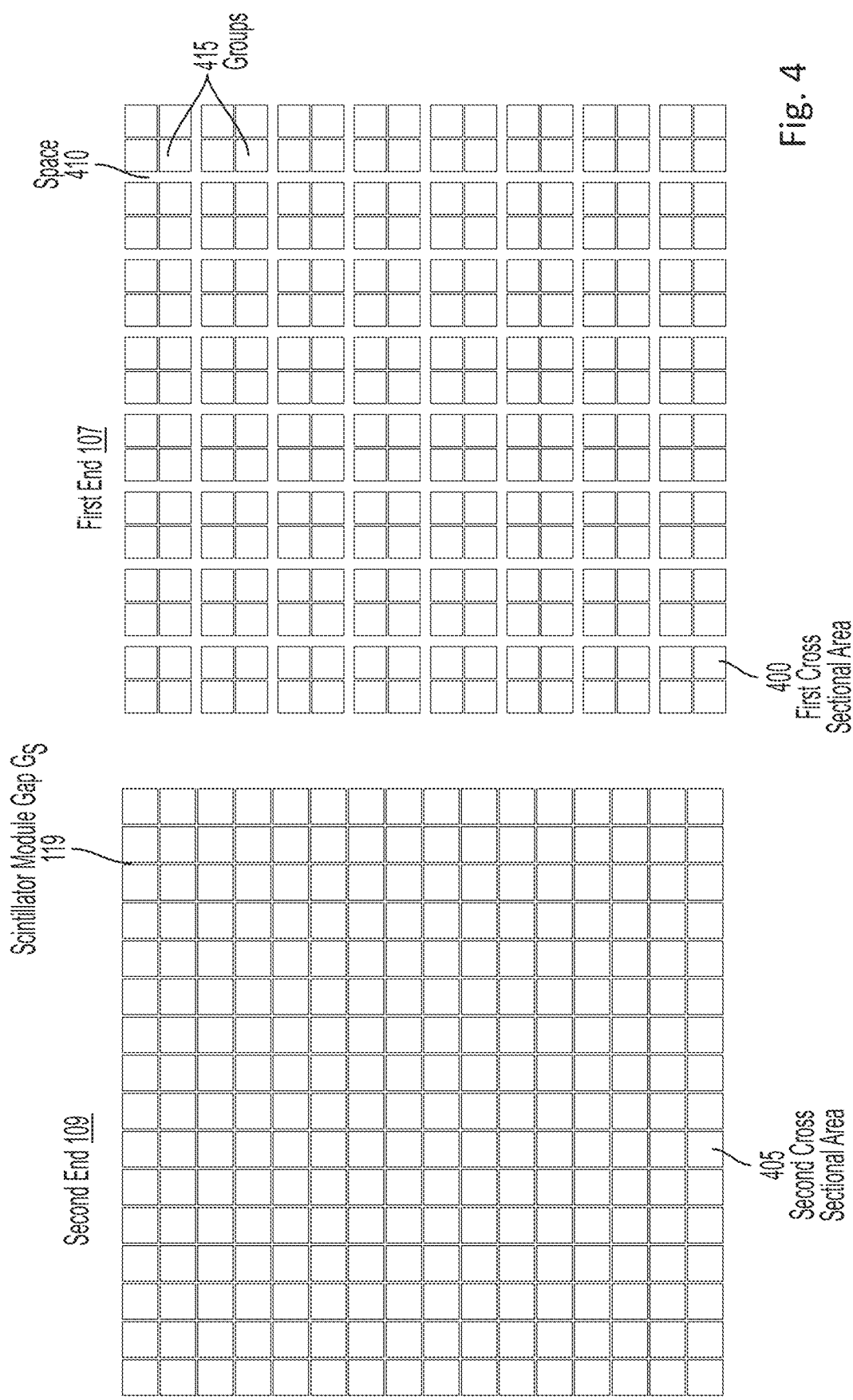

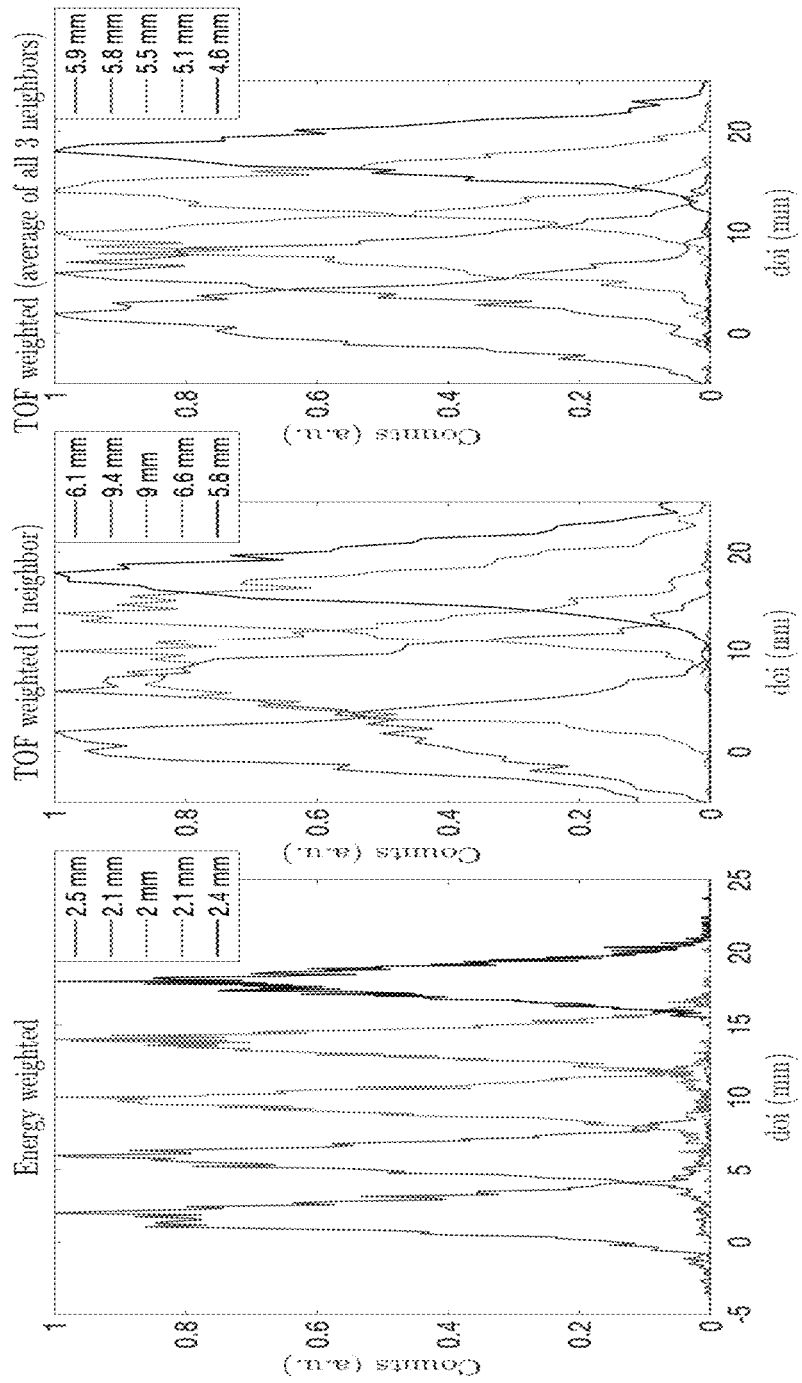

TAPERED SCINTILLATOR CRYSTAL MODULES AND METHODS OF USING THE SAME

CROSS-REFERENCE TO RELATED APPLICATION

This application claims the benefit of and priority to U.S. Provisional Application Ser. No. 63/073,785 filed on Sep. 2, 2020, the entirety of which is incorporated by reference.

FIELD

This disclosure relates generally to the field of radiation imaging and, in particular, to positron emission tomography (PET).

BACKGROUND

Imaging with PET is a powerful technique used primarily for diagnosis, treatment selection, treatment monitoring and research in cancer and neuropsychiatric disorders. Despite its high molecular specificity, quantitative nature and clinical availability, PET has not been able to achieve its full potential as the go-to molecular imaging modality due in large part to its relatively poor spatial resolution. With this kind of spatial resolution, the current device cannot possibly measure target density in small nodules and in many human and rodent brain regions relevant to disease etiology and pathophysiology.

Detector systems for PET require thick, high density scintillator crystal modules such that the high energy (511 KeV) gamma rays used in PET may be efficiently detected. Having high geometric efficiency (e.g., minimal gaps or pitch between scintillator crystal modules) is also critical to achieve high gamma ray detection sensitivity (and increase the spatial resolution) in PET.

Depth-encoding PET detector modules have been developed to mitigate parallax error (mispositioning of the line of response) for long scintillator crystals. This enables small diameter PET rings with reduced component cost per detector ring, large solid angle coverage for increased sensitivity, and reduced contribution of annihilation gamma ray acollinearity on spatial resolution when using crystals with small cross-sectional area. In addition, depth-of-interaction (DOI) information can be used to deconvolve optical photon transport in long crystals, thus improving timing resolution and spatial resolution uniformity. Additionally, a known PET system has time-of-flight (TOF) readout capabilities, which improve signal-to-noise (SNR and sensitivity) by accurately estimating gamma ray origin position.

However, in known DOI-PET detector module(s), such as ones that have a light guide coupled to a distal end of the scintillator modules (distal from the optical sensor), a tradeoff exists between the spacing (gap) between scintillator modules and DOI/TOF performance. This is due to a majority of optical photons interact with the sensor array from the edge of the scintillator modules. Reducing the spacing (gap) between adjacent scintillator modules, increases the light leakage to the neighboring pixels, which can be detrimental to TOF and DOI performance. Of note, TOF may be correlated with DOI. However, the correlation is weakened by the optical photon leak (light leakage) to pixels adjacent to a primary pixel causes by imperfect coupling.

Additionally, having part of the scintillator module overlap with a gap between optical sensors (pixel gap) can result in a loss of the signal along the edges.

SUMMARY

Accordingly, disclosed is a particle detection device which may comprise an array of optical sensors arranged in a 2-dimensional array and a plurality of scintillator modules. There may be a first gap between adjacent optical sensors. Each optical sensor may correspond to a pixel. Each optical sensor may have an active area. At least one scintillator module may correspond with a respective optical sensor in the array. Each scintillator module may have a first end and a second end. The first end may be in contact with a corresponding optical sensor. There may be a second gap between adjacent scintillator modules. The second gap being defined as a minimum gap between the adjacent scintillator modules. Scintillator modules adjacent to a boundary of the active area of a corresponding optical sensor may have a tapered portion at the first end such that a first cross sectional area at the first end overlaps the active area as viewed along a direction of a longitudinal axis. The first cross sectional area is defined as orthogonal to the longitudinal axis. The second gap may be smaller than the first gap.

In an aspect of the disclosure, a second cross sectional area at the second end may be larger than the first cross sectional area. The second cross sectional area being defined as orthogonal to the longitudinal axis. In an aspect of the disclosure, at least a portion of the second cross section area at the second end may overlap the first gap as viewed along the direction of the longitudinal axis.

In an aspect of the disclosure, the first cross sectional area may be substantially circular in shape.

In an aspect of the disclosure, there may be a one-to-one correspondence between the scintillator module and the optical sensor (one-to-one coupling). The first cross sectional area may be rectangular and all four sides at the first end may be tapered.

In other aspects of the disclosure, there may be a four-to-one correspondence between the scintillator modules and the optical sensor (four-to-one coupling). In an aspect of the disclosure, the first cross sectional area of each scintillator module may be defined by a plurality of sides and, at least two sides of the scintillator module facing a respective boundary of the active area may be tapered at the first end. In other aspects, only sides of the scintillator module facing a respective boundary of the active area may be tapered at the first end.

In an aspect of the disclosure, the tapered portion may have a tapered length in a direction parallel to the longitudinal axis, and the tapered length may be less than a third of length from the first end and the second end in the direction parallel to the longitudinal axis. The tapered length may be the same for each scintillator module that has the tapered portion.

In an aspect of the disclosure, the scintillator module may be about 20 mm long in the longitudinal direction. In this aspect, the tapered length may be about 5 mm.

In an aspect of the disclosure, the second cross sectional area may be about 1.5 mm×about 1.5 mm and the first cross section area may be about 1.4 mm×about 1.4 mm. The active area may be about 3.0 mm×3.0 mm.

In an aspect of the disclosure, the device may further comprise a light guide. The light guide may be segmented. In an aspect of the disclosure, the segmented light guide may comprise a plurality of prismatoids. Each prismatoid may be configured to redirect particles of radiation between the second ends of the scintillator modules. In an aspect of the disclosure, the segments of the light guide may be offset with the optical sensors such that a first scintillator module in contact with a first optical sensor and a second scintillator module in contact with a second optical sensor are in contact with a same segment.

In an aspect of the disclosure, the device may further comprise a reflector. In an aspect of the disclosure, the reflector may be positioned on the light guide. In other aspects, the reflector may be positioned between the segments of the light guide. In another aspects, the reflector may be positioned between each scintillator module including in a space between the tapered portion and another scintillator module.

In an aspect of the disclosure, the second end of certain scintillator modules may have a second tapered portion. The second tapered portion may have its longitudinal length smaller than the longitudinal length of the tapered portion.

In an aspect of the disclosure, since the segments are offset with the optical sensor, a side of a scintillator module which may be tapered at the second end may be different from a side of the scintillator module which may be tapered at the first end.

Also disclosed is a particle detection device which may comprise an array of optical sensors arranged in a 2-dimensional array and a plurality of scintillator modules which may corresponding to a respective optical sensor. There may be a first gap between adjacent optical sensors. Each optical sensor may correspond to a pixel. Each optical sensor may have an active area. Each scintillator module may have a first end and a second end. The first end may be in contact with its corresponding optical sensor. There may be a second gap between adjacent scintillator modules. The second gap is defined as a minimum gap between the adjacent scintillator modules. At least a subset of the plurality of scintillator modules corresponding a respective optical sensor may have a tapered portion at the first end. The location of the taper portion may depend on the relative location of the scintillator modules within the active area and a respective boundary of the active area. The second gap may be smaller than the first gap.

In an aspect of the disclosure, the device may further comprise reflector positioned between each scintillator module including in a space between the tapered portion and another scintillator module.

In an aspect of the disclosure, the scintillator modules located at a corner of the active area may have at least two sides tapered at the first end such that a first cross sectional area at the first end overlaps the active area as viewed along a direction of a longitudinal axis. The first cross sectional area is defined as orthogonal to the longitudinal axis. In other aspects, only the two sides of the scintillator module located at the corner of the active area may be tapered at the first end.

In an aspect of the disclosure, the scintillator modules located between other scintillator modules which are located at the corner of the active area and aligned may only have one side tapered at the first end such that the first cross sectional area at the first end overlaps the active area as viewed along the direction of the longitudinal axis. The one side may face a boundary of the active area.

In an aspect of the disclosure, scintillator modules having other scintillator modules which are located between the scintillator modules and a boundary of the active area may not have the tapered portion at the first end.

BRIEF DESCRIPTION OF THE DRAWINGS

FIG. 4 illustrates a side-by-side view of the untapered end (second end) and tapered end (first end) of scintillator modules;

FIGS. 19A-19C illustrate graphs showing three calculated parameters for depth-of interaction, where FIG. 19A shows energy-based DOI, FIG. 19B shows timing based using one timestamp and FIG. 19C shows timing based using three timestamps (averaged).

DETAILED DESCRIPTION

In accordance with aspects of the disclosure, certain scintillator modules have the end closest to the optical sensors 120 tapered such that unintended photon (light) leakage to neighboring or adjacent pixels (different optical sensors) are reduced. In accordance with aspects of the disclosure, these scintillator modules will not have the end closest to the optical sensor overlapping the gap between sensors $G_D$ as viewed in the longitudinal direction, which also reduces the loss of signal along the edges. At the same time, the geometric efficiencies (gap between adjacent modules, as determined from the minimum gap between the adjacent modules) are retained which enables high gamma ray detection sensitivity. Since the distal end of the scintillator module may not be tapered and thus may be full width, the efficiencies are retained because the distal end has the highest probability for gamma ray interaction based on Beer-Lambert law for photoelectric absorption.

Figure 1:
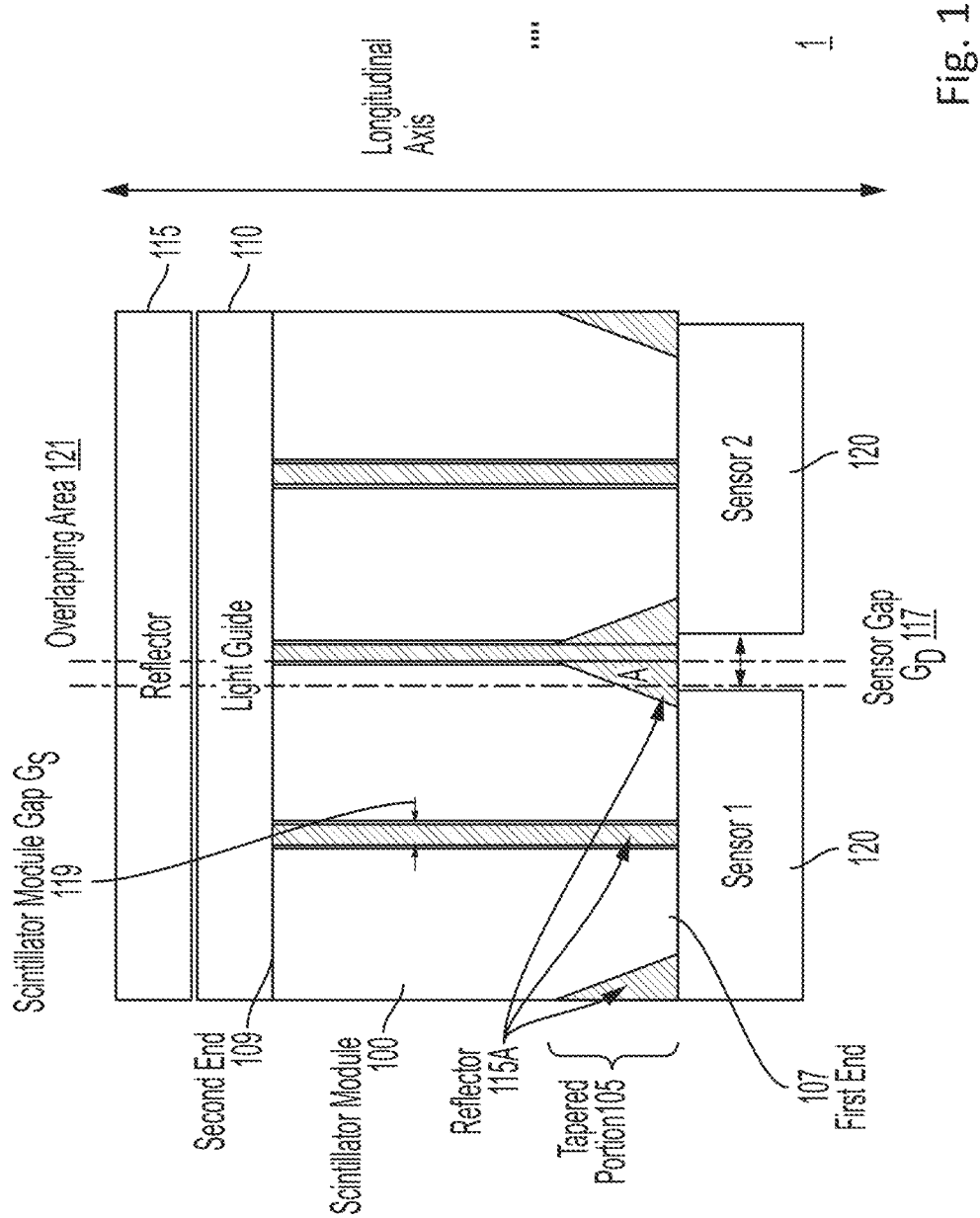
FIG. 1 illustrates a sectional view of a representation of a particle detection device in accordance with aspects of the disclosure where there is a four-to-one scintillator module to optical sensor coupling.
Figure 2:
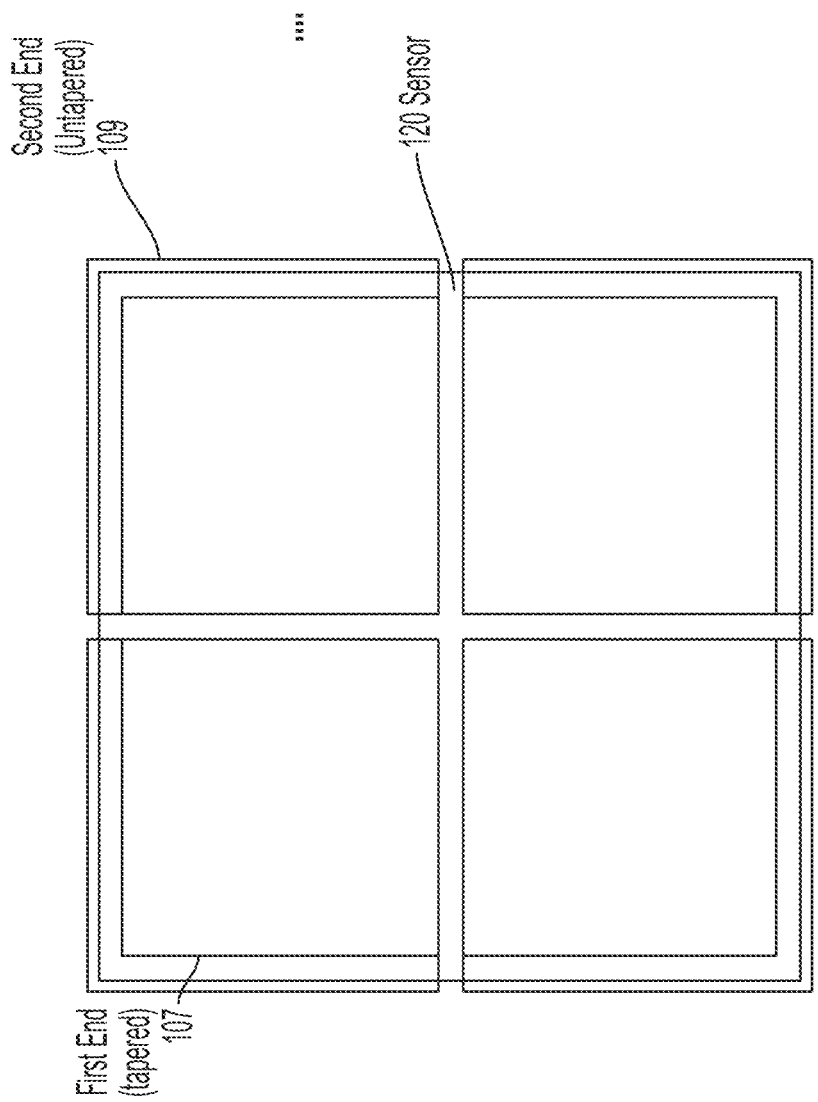
FIG. 2 illustrates a view of an optical sensor showing a tapered end (first end) of scintillator modules and the untapered end (second end) with respect to the optical sensor in accordance with aspects of the disclosure where there is a four-to-one scintillator module to optical sensor coupling.
Figure 3:
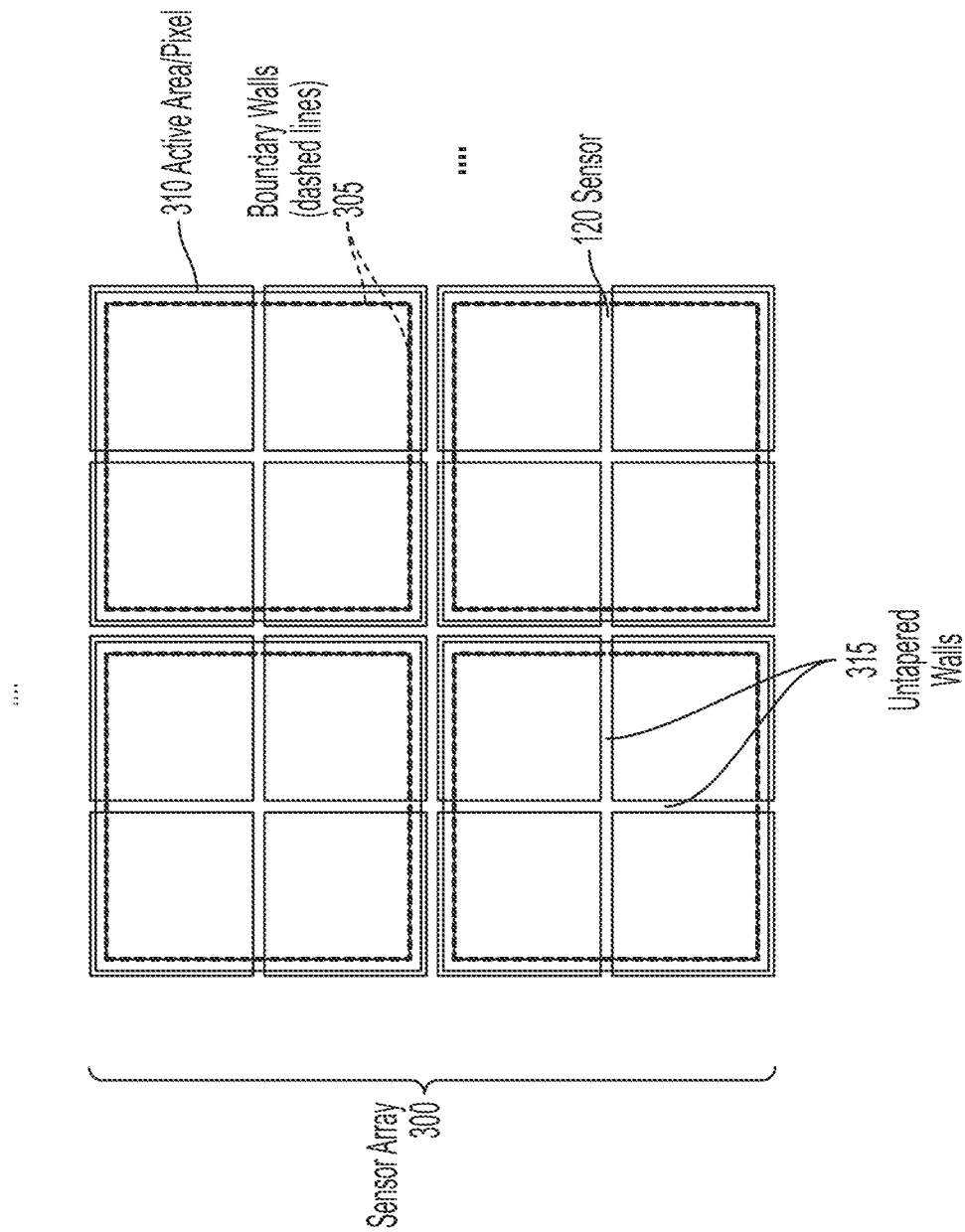
FIG. 3 illustrates a view of a sensor array with the scintillator modules showing tapered and untapered walls (portions) of the scintillator modules where there is a four-to-one scintillator module to optical sensor coupling.

In accordance with aspects of the disclosure, the scintillator modules may be arranged in different configurations. For example, FIG. 1 illustrates an example of a scintillator module arrangement. In FIG. 1, for each optical sensor 120, there are four scintillator modules 100 although FIG. 1 is a sectional view only showing two scintillator modules per optical sensor 120. The four scintillator modules are shown in FIGS. 2 and 3.

Each scintillator module 100 may be fabricated from lutetium-yttrium oxyorthosilicate (LYSO) crystals. The scintillator module 100 is not limited to LYSO and other types of crystals may be used that emits a light photon in the present of incident gamma radiation, such as Lutetium oxyorthosilicate (LSO). One end of the scintillator modules 100 may be in contact with an optical sensor 120 (first end 107).

Figure 14:
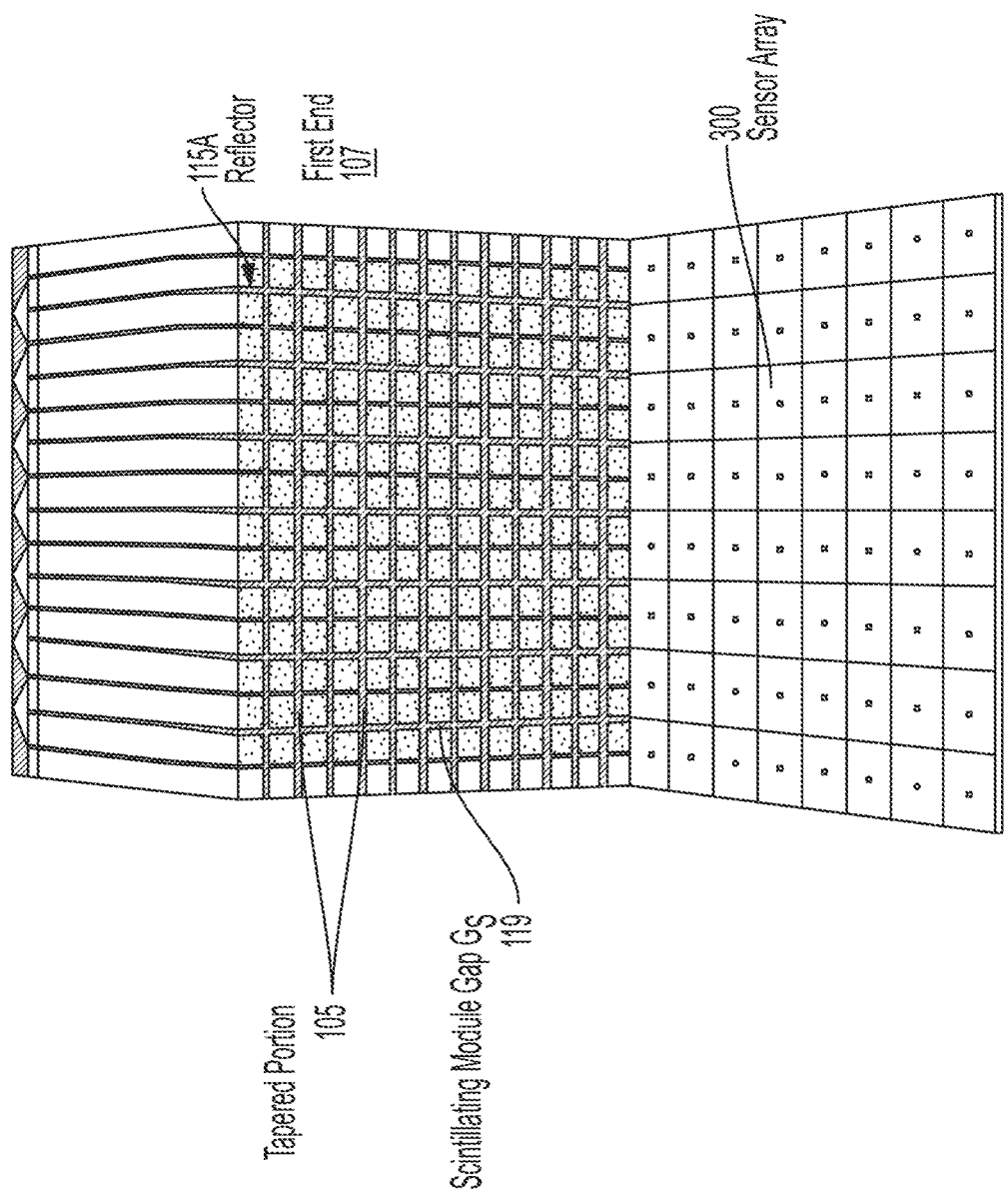
Figure 15:
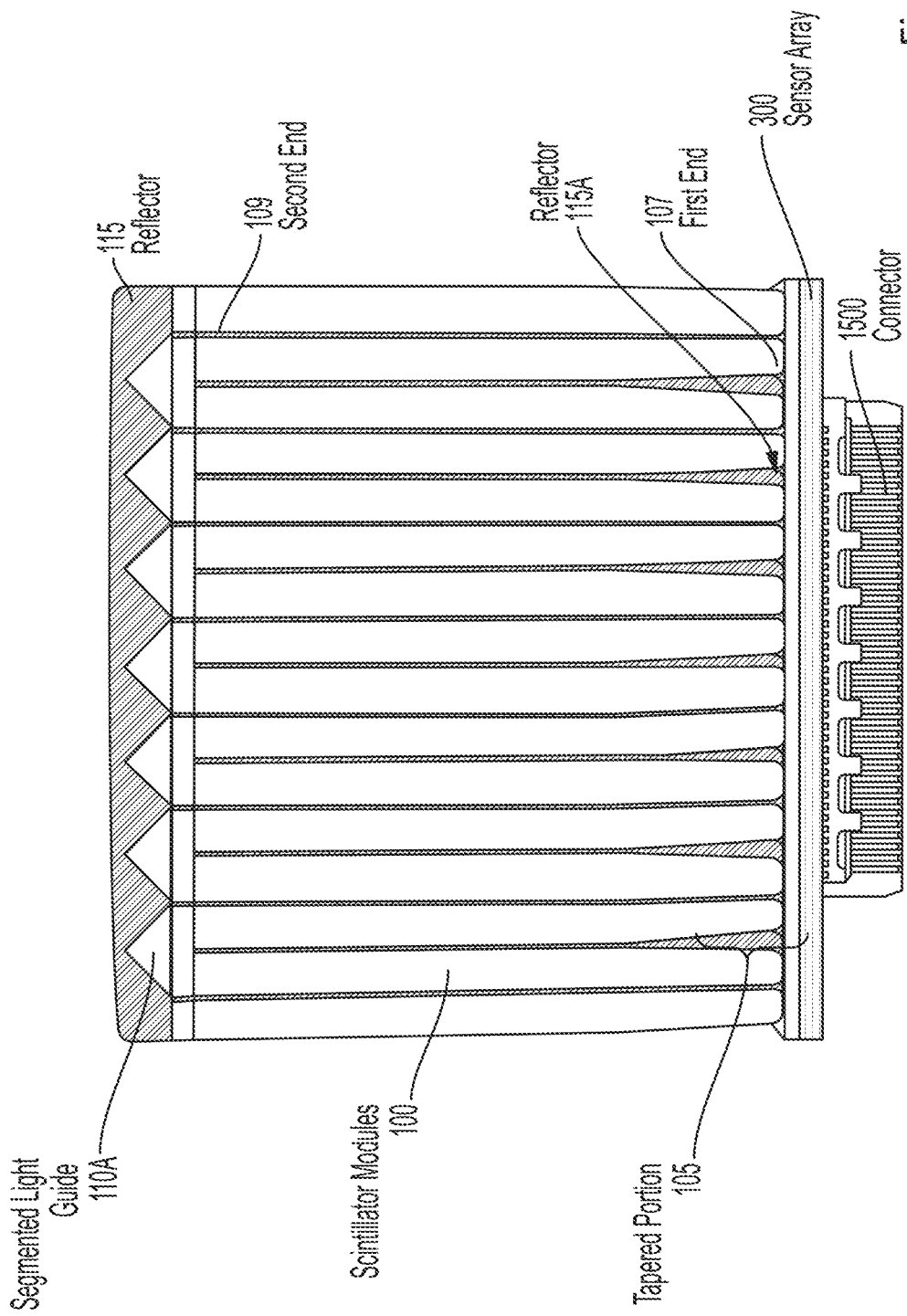

In an aspect of the disclosure, the optical sensors 120 may be a silicon photomultiplier (SiPM). In other aspects of the disclosure, the optical sensors 120 may be avalanche photodiodes (APDs), single-photon avalanche (SPADs), photomultiplier tubes (PMTs), silicon avalanche photodiodes (SiAPDs). These are non-limiting examples of solid state detectors which may be used. While in FIG. 1, the optical sensors 120 are shown separate, the optical sensors 120 may be manufactured in a single package or plate having spaces between the sensors (active area 300). An example of the package or plate is shown in FIGS. 14 and 15 (sensor array 300). The number of optical sensors 120 (pixels) in the device 1 may be based on the application and size of a PET system. In an aspect of the disclosure, the optical sensors 120 may be positioned in a two-dimensional array such as an 8×8 array. The two-dimensional array are formed in a plane orthogonal to the longitudinal axis of the scintillator module. The direction of the longitudinal axis is shown in FIG. 1. For purposes of the description, the longitudinal axis is the z-direction and the two-dimensional array is in the x-y directions. The optical sensors 120 are positioned in the array such that there is a sensor gap $G_D$ 117 (shown in FIG. 1 with the double ended arrow). The four dots in FIG. 1 indicate other sensors/modules in the array, which are not specifically shown in the view.

With the 8×8 array, the scintillator modules 100 are positioned in a 16×16 array (to achieve the four-to-one coupling between modules 100 and optical sensor 120). The scintillator modules 100 are arranged to have a module gap $G_s$ 119. The module gap $G_s$ referred to herein defines the minimum distance between adjacent or neighboring scintillator modules in the x-direction or the y-direction (untapered portions). An example of the module gap $G_s$ 119 is shown in FIG. 1 with the double ended arrow.

In accordance with aspects of the disclosure, the module gap $G_s$ 119<a sensor gap $G_D$ 117, such that the detection device 1 has a high gamma ray detection sensitivity. Due to this, there is an overlapping area 121 shown in FIG. 1, where the scintillator module 100 overlaps with the sensor gap $G_D$ (as viewed in the longitudinal direction). The overlapping area 121 is shown between two dashed lines.

The second end 109 (distal end relative to the optical sensor 120) of the scintillator module 100 is in contact with a light guide 110. The light guide 110 may be any light guide such as a single uniform waveguide. The light guide 100 is configured for intercrystal light sharing between scintillator modules 100 including between modules 100 of different pixels or associated with different optical sensors 120.

Figure 5A:
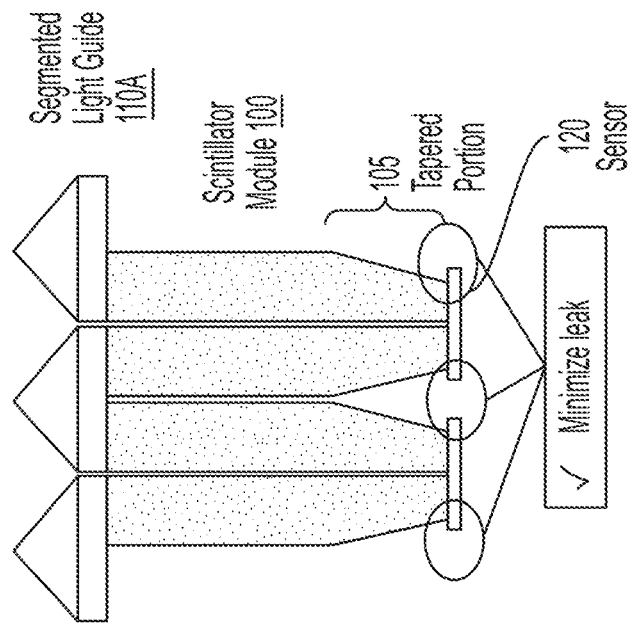
FIGS. 5A and 5B illustrate a side-by-side view comparing leakage in a known particle detection device verses a particle detection device in accordance with aspects of the disclosure.
Figure 5B:
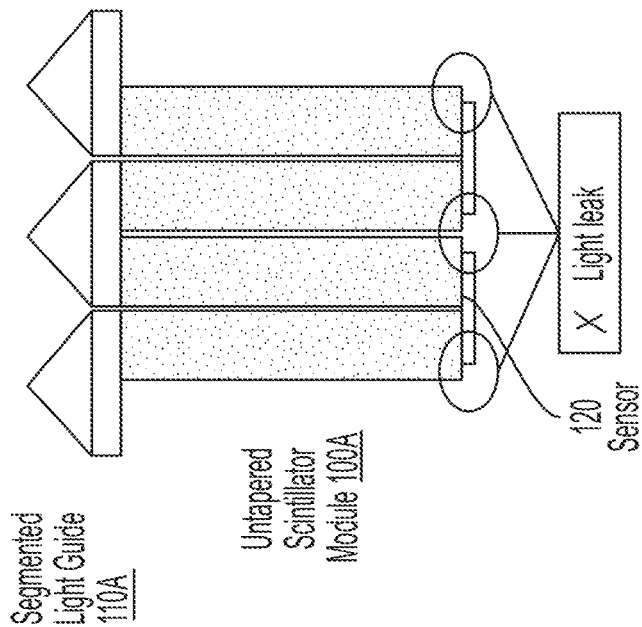

In other aspects, the light guide 110 may be a segmented light guide 110A such as shown in FIG. 5B. Each segment is configured to redirect particles between certain scintillator modules. An example of a segmented light guide is described in U.S. Pat. Pub. No. 2020/0326434, the disclosure of which is incorporated herein by reference. The location of each segment is offset from the optical sensor 120 (in either the x-direction or y-direction). As shown in FIG. 5B, a segment of the light guide is in contact with a scintillator module associated with a first optical sensor (e.g., Sensor 1) and another scintillator module associated with a second optical sensor (e.g., Sensor 2) such that the light may be shared between adjacent pixels. In an aspect of the disclosure, each segment only couples scintillator modules belonging to different optical sensors (pixels).

Each segment of the light guide 110A may comprise a prismatoid. In an aspect of the disclosure, the prismatoid may be substantially shaped as at least one of at least one prism, at least one antiprism, at least one frustum, at least one triangle, at least one cupola, at least one parallelepiped, at least one wedge, at least one pyramid, at least one truncated pyramid, at least one portion of a sphere, at least one cuboid, and at least one pyramid.

The use of the segments enhances intercrystal light sharing ratios, thus improving both crystal identification and DOI resolution. In some aspects of the disclosure, different designed prismatoids may be used depending on the position of the segment within the scintillator array. For example, there may be three different designs: corner prismatoids, center prismatoids and edge prismatoid, where the corner prismatoids and the edge prismatoids are designed for mitigating edge and corner artifacts.

Certain scintillator modules 100 have a tapered portion 105. In an aspect of the disclosure, the tapered portion 105 is at the first end 107. As shown in FIG. 1, a wall of the scintillator module 100 is angled inwardly. The angle A is defined by a virtual line parallel to the longitudinal axis and extending along a wall or surface of the scintillator module (which is also parallel to the longitudinal axis) and the tapered wall (acute angle). In an aspect of the disclosure, the tapering results in the first end 107 (contact end) not overlapping with the sensor gap $G_D$ (in other words, the first end overlaps the active area of the sensor 120 only). Although, FIG. 1 shows that the tapered wall (wall between the start of the taper and the sensor surface) is straight (linear profile), in other aspects the wall may be arced (curved profile). Since the first end 107 only overlaps the active area 310 of the optical sensor 120 and not the gap between sensors $G_D$, the loss of signal along the edges due to photon leakage is reduced.

In an aspect of the disclosure, the angle A is selected to ensure that the first end 107 does not overlap the sensor gap $G_D$, but at the same time the angle A is not too steep that the photons are reflected off the surface of the tapered wall and retained within the scintillator module 100 (and not detected).

In another aspect of the disclosure, the starting point, for the tapering, may be selected to maintain a high sensitivity. For example, if the taper starts near the second end 109 and gradually tapers all the way to the first end 107, the sensitivity may be reduced since the overlapping area 121 would be small and as noted above the majority of optical photons interact with the sensor array is from the edge of the scintillator modules. Starting the taper near the second end 109 increases the distance between adjacent scintillator modules over a longer length in the longitudinal axis. In some aspects of the disclosure, the taper may start closer to the first end 107 than the second end 109. For example, the taper may start less than halfway between the first end 107 and the second end 109. In other aspects of the disclosure, the taper may start about ⅓ between the first end 107 and the second end 109 (closer to the first end 107).

As shown in FIG. 1, the device 1 may also comprise a reflector 115. The reflector 115 may comprise barium sulfate $BaSO_4$. In other aspects, the reflector 115 may comprise other reflective materials. In an aspect of the disclosure, a reflector 115A may be used between each of the scintillator modules 100. Further, in an aspect of the disclosure, the space that results from the tapered portion 105 may be also filled with a reflector 115A. In the figures, to highlight that the spacing that results from the tapered portion may also be filled with the reflector, the reflector 115A in that space is shown with a different hashing than the reflector 115A in gap between scintillator modules (119). The reflector 115A may be made of the same material as reflector 115, such as but not limited to barium sulfate $BaSO_4$. This material has a high spatial performance that does not degrade the energy and timing resolution. In a case where a segmented light guide 110A is used, the reflector 115 may also fill any space between the segments of the segmented light guide 110A.

FIG. 2 illustrates the relationship between the first end of the scintillator module (first end 107, which is tapered) and the second end of the scintillator module (second end, which may not be tapered 109) and an optical sensor 120. As seen in FIG. 2, the second end 109 has a portion that does not overlap with the sensor 120 (active area) whereas the first end 107 (tapered) overlaps the sensor 120 and does not have a portion that does not overlap with the sensor 120.

In an aspect of the disclosure, the walls of the scintillator module 100 facing the boundary or edge of an optical sensor 120 may be tapered. FIG. 3 illustrates an example of a sensor array 300. The four dots represent other sensor/scintillator modules in the array (four sensors are specifically shown for illustrative purposes). Each sensor 120 has an active area 310 (defining a pixel). Each active area has four sides which is defined by edges or bounds. As shown in FIG. 3, walls of the scintillator modules facing the boundaries or edges of the active area (boundary walls 305) may be tapered. These walls are shown in FIG. 3 using dashed lines. On the other hand, walls of the scintillator modules which do not face the boundaries or edges of the active area (inner walls) may not be tapered (untapered walls 315) to maintain a high gamma ray detection sensitivity.

FIG. 4 shows an example of the relative size of the tapered end (first end 107) verses the untapered end (second end 109) side-by-side. The first end 107 has a first cross sectional area 400 and the second end 109 has a second cross sectional area 405. The first cross sectional area 400 and the second cross sectional area 405 are areas orthogonal to the longitudinal axes (e.g., areas in the x-y plane). The first cross sectional area 400 is the area in contact with the optical sensor 120. The second cross sectional area 405 is the area in contact with the light guide 110/110A.

As shown in FIG. 4, the sensor array 300 is 8×8 (as noted above) and there is a four-to-one coupling (therefore, there is a scintillator module array that is 16×16). As can be seen in FIG. 4, the space 410 between scintillator modules associated with different optical sensors is larger than the scintillator module gap $G_S$ 119. This space 410 may be greater than or equal to the sensor gap $G_D$ 117. In other words, the first cross sectional area 400 does not have to reach the boundary of the active area 310 (pixel). The spacing (at the first end) between scintillator modules 100 within a group 415 is smaller than the spacing (space 410) intergroup (between groups 415). As shown in FIG. 4, there are four scintillator modules 100 in a group 415, e.g. four-to-one coupling.

FIGS. 2-4 show the first end (first cross sectional area 400) substantially having a rectangular shape. However, in other aspects of the disclosure, the first cross sectional area may have other shapes. The shape may be a functional of the fabrication process and tolerances. For example, the shape may be substantially circular. For example, the tapered portion 105 may look conical.

Where the shape is circular, the tapered portion 105 may only correspond to the portions facing the boundary or edge of the active area such as half of the circle. The shape may be squircle, reuleaux triangle, spherical triangles, hexagon, pentagon, octagon, etc.

Figure 6:
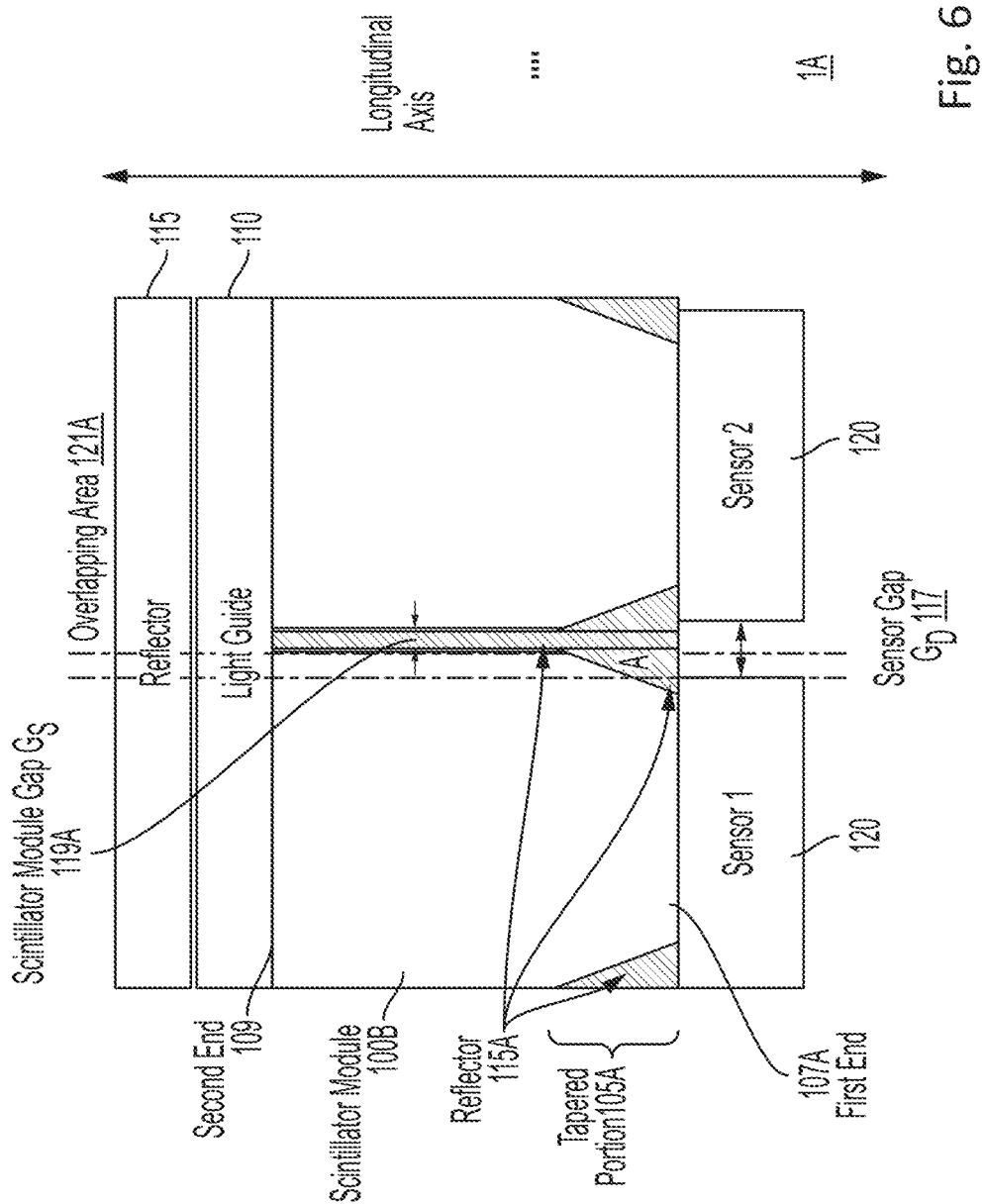
FIG. 6 illustrates a sectional view of a representation of a particle detection device in accordance with other aspects of the disclosure where there is a one-to-one scintillator module to optical sensor coupling.
Figure 7:
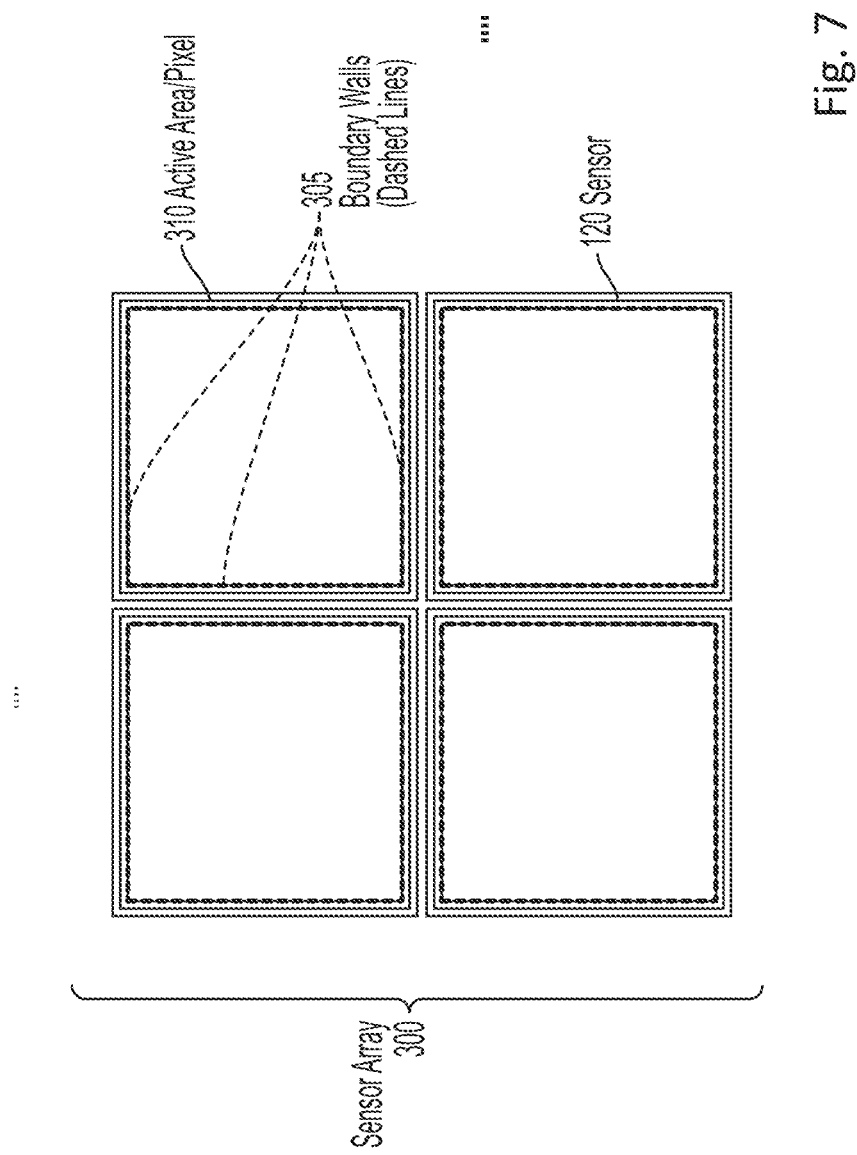
FIG. 7 illustrates a view of a sensor array with the scintillator modules showing tapered and untapered walls (portions) of the scintillator modules where there is a one-to-one scintillator module to optical sensor coupling.

FIG. 5A and FIG. 5B illustrate a portion of a detection device with untapered scintillator modules 100A and a detection device with scintillator modules 100 where certain modules have a tapered portion 105 in accordance with aspects of the disclosure. As shown in FIG. 5A, since the first end extends beyond the optical sensor (overlaps with the gap between sensors), light may be leaked and sensitivity is reduced. In contrast, in accordance with aspects of the disclosure, since the first end 107 is tapered (has a tapered portion 105), where the first end 107 does not extend into the gap $G_D$ and beyond the active area 310 of the optical sensor 120, unintended leakage is reduced, e.g., minimized and in some cases, any leakage may be below a background noise level and thus may not be detectable The detection device 1 may have other configurations (other than a four-to-one coupling). For example, the detection device 1A may have a one-to-one coupling configuration as shown in FIGS. 6 and 7. The scintillator modules 100B and optical sensors 120 are arranged in a two-dimensional array. The scintillator modules 100B have a scintillator module gap $G_S$ 119A. The size of the gap may be different from the size of the gap in the four-to-one coupling configuration. The scintillator module 100B as an overlapping areas 121A where the scintillator module 100B overlaps with the sensor gap/pitch $G_D$ 117 as viewed in longitudinal axis direction. In FIG. 6, two sensors 120 (e.g., Sensor 1 and Sensor 2) are shown for descriptive purposes, other sensors are represented by four dots.

The scintillator modules 100B may have a tapered portion 105A at the first end 107A. Since in this configuration, there is only one scintillator module 100B per optical sensor 120, all walls (sides) of the scintillator module 100B extending in the longitudinal axis direction (z-direction) are boundary walls (are near the boundary or edge of the active area and therefore all of the walls may be tapered. FIG. 7 illustrates an example of a sensor array 300, specifically illustrating four sensors for descriptive purposes. Other sensors in the array are represented by the four dots. In FIG. 7, the tapered boundary walls 305 are identified with dashed lines.

While FIG. 7 shows four walls being tapered, in other aspects of the disclosure, less than four walls may be tapered. For example, in a case where the optical sensor is at a corner of the sensor array, walls (sides) not adjacent to other sensors 120 may not be tapered.

Figure 8:
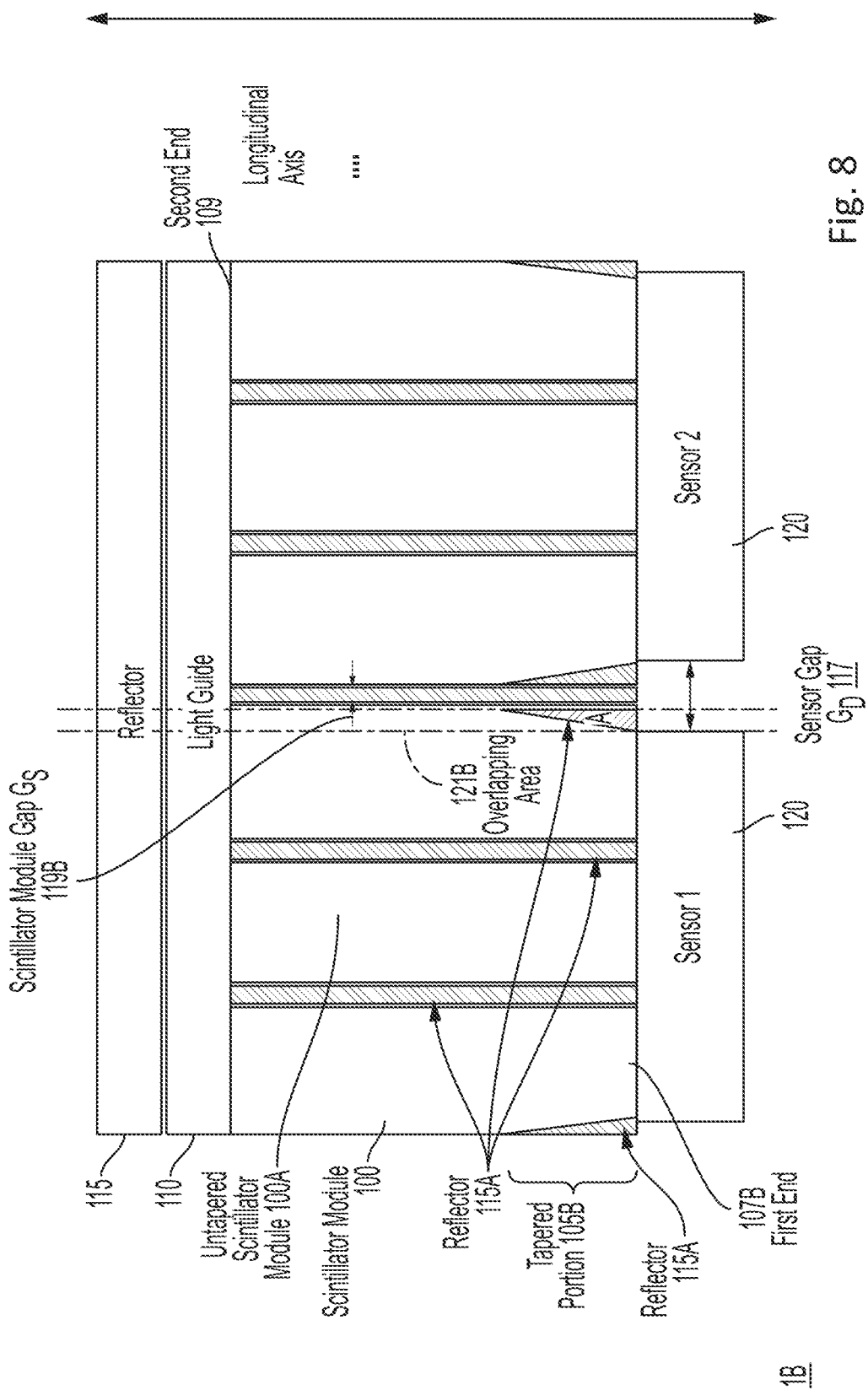
FIG. 8 illustrates a sectional view of a representation of a particle detection device in accordance with other aspects of the disclosure where there is a nine-to-one scintillator module to optical sensor coupling.
Figure 9:
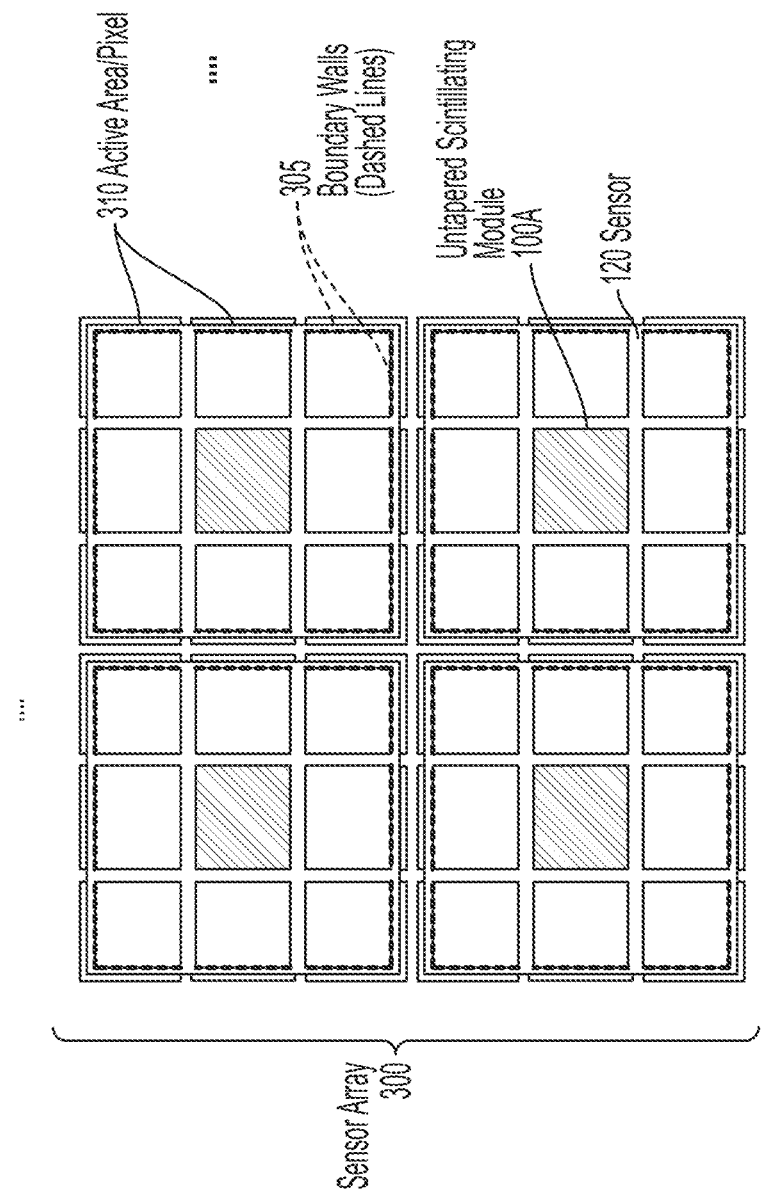
FIG. 9 illustrates a view of a sensor array with the scintillator modules tapered based on the relative location within the active area where there is a nine-to-one scintillator module to optical sensor coupling.

FIGS. 8 and 9 illustrate a representation of another detection device 1B in accordance with aspects of the disclosure. The detection device 1B has a nine-to-one coupling configuration. Nine scintillator modules 100 correspond to one sensor 120. In FIG. 8, two sensors 120 (e.g., Sensor 1 and Sensor 2) are shown for descriptive purposes, other sensors are represented by four dots.

The scintillator modules 100/100A and optical sensors 120 are arranged in a two-dimensional array. The scintillator modules 100/100A have a scintillator module gap $G_S$ 119B. The size of the gap may be different from the size of the gap in the four-to-one coupling configuration or the one-to-one coupling configuration. The scintillator module 100 has an overlapping areas 121B where the scintillator module overlaps with the sensor gap $G_D$ 117 as viewed in the longitudinal axis direction.

In accordance with aspects of the disclosure, certain scintillator modules may be tapered at the first end 107B. The tapering may be based on a relative location of the scintillator module with respect to the active area 310, e.g., adjacent to a boundary or edge of the active area 310. In a case where the scintillator module 100A is not adjacent to a boundary or edge of the active area 310, the scintillator module 100A may not be tapered. However, in a case where the scintillator module 100 is located adjacent to a boundary or edge of the active area 310, one or more walls of the scintillator module 100 may be tapered. In an aspect of the disclosure, the tapered portion 105B may be at the first end 107B. Similar to above, the taper is such that there is no overlapping area or portion at the first end 107B with the sensor gap $G_D$ 117 (even though there may be an overlapping area 121B distal of the tapered portion 105B).

In an aspect of the disclosure, the number of walls tapered may also depend on the location of the scintillator module 100 with respect to the active area 310. For example, as shown in FIG. 9, scintillator modules 100 positioned at a corner of the active area 310, may have two walls tapered (two boundary walls 305). Boundary walls 305 are shown in FIG. 9 with dashed lines. In other aspects, in a case where the scintillator modules 100 are not in a corner, but still are adjacent to a boundary or edge of the active area 310, the scintillator modules 100 may only have one of the wall tapered (e.g., wall facing the boundary or edge). In other aspects, other walls (non boundary walls) may be tapered if desired.

In the example illustrated in FIG. 9, four scintillator modules 100 have two walls tapered (corner modules), four scintillator modules 100 have one wall tapered (scintillator modules between the corner modules) and one scintillator module 100A is untapered.

In the example illustrated in FIG. 9, four optical sensors 120 are specifically depicted in the array, other optical sensors are represented by the dots.

Other scintillator module 100/sensor 120 configuration may be used in accordance with aspects of the disclosure, such as 16-to-1 coupling or non-symmetrical coupling such as 2×1, etc.

In an aspect of the disclosure, where multiple walls (sides) of a scintillator module 100 is tapered, the taper amount may be about the same to provide symmetry. However, when the scintillator module 100 is manufactured as the walls (sides) are tapered, there may be a tolerance in the amount of taper due to limitations in the manufacturing process. The term "about the same" used herein also includes differences in size as a result of the manufacturing and tolerances.

The use of the phrase "a side(s)" or "a wall(s)" is tapered may also refer to a portion(s) or surface(s) of the scintillator module 100 being tapered. For example, in a case where the scintillating module is cylindrical and has only curved surfaces in the longitudinal direction (z-direction), a portion of the scintillator module 100 may be tapered (the portion which faces a boundary or edge of the active area).

Figure 10:
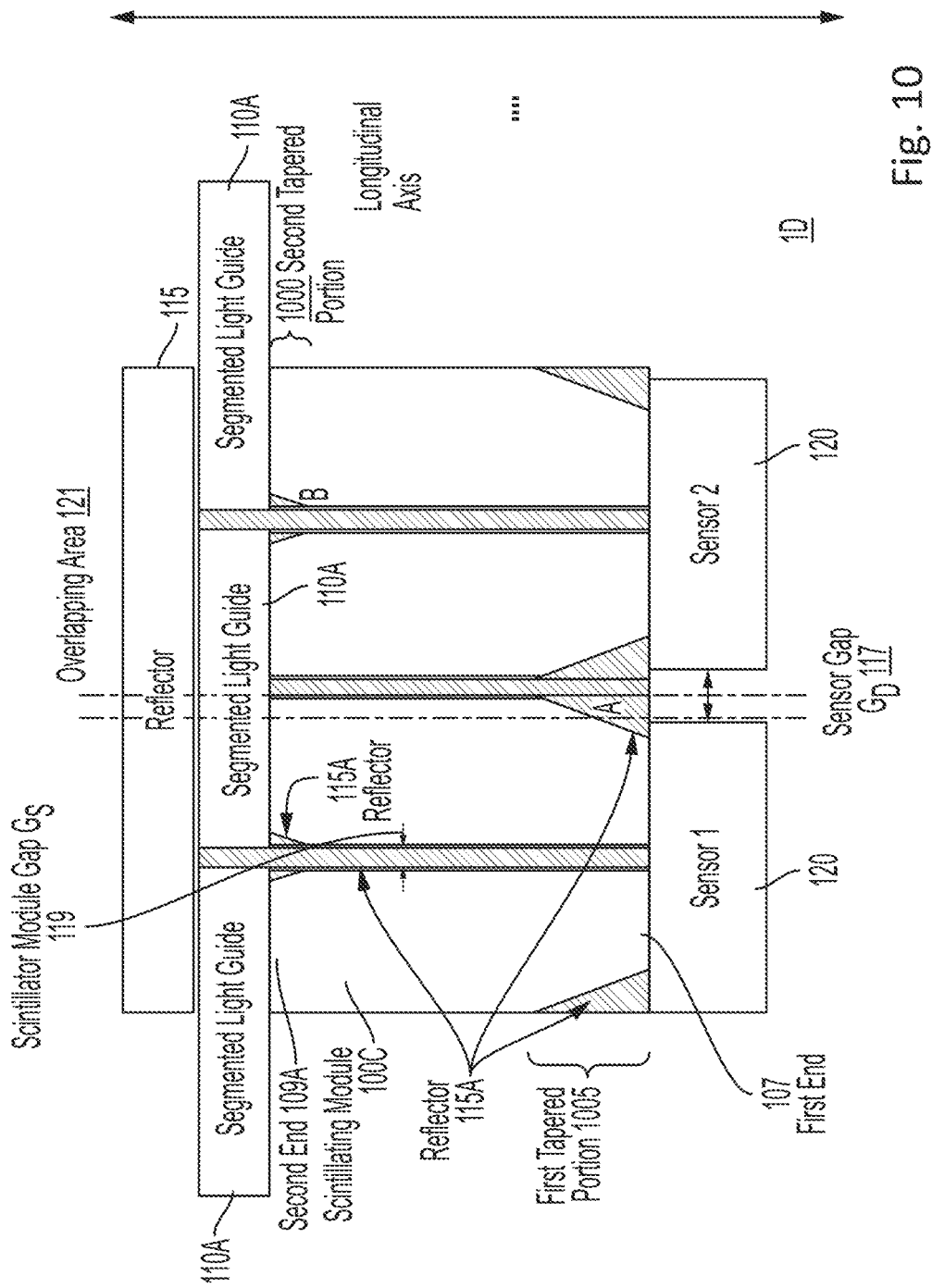
FIG. 10 illustrates a sectional view of a representation of particle detection device in accordance with other aspects of the disclosure where the first end and the second end of certain scintillator modules are tapered in accordance with aspects of the disclosure.

FIG. 10 illustrates a sectional view of representation of a particle detection device 1D in accordance with other aspects of the disclosure. In accordance with this aspect of the disclosure, both the first end 107 and the second end 109A may have a tapered portion for certain scintillator modules 100C (e.g., a first tapered portion 1005 and a second tapered portion 1000). Tapering the first end 107 was described above and will not be described again in detail.

In this aspect of the disclosure, the second end 109A may be tapered to reduce the loss of signal along the edges due to misalignment of the segmented light guide 110A and scintillator module 100C. A slight misalignment may be an artifact of a manufacturing process where perfect alignment (edge of scintillator module perfectly coincides with or is aligned with the edge of the segment of the light guide rarely occurs). When there is a misalignment and a portion of the second end of the scintillator module extends beyond the segment of the segmented light guide 110A, photons may be lost (not reflected). Since as noted above, a majority of optical photons interact with the optical sensor are from the edge of the scintillator modules, losing photons from the edge may degrade the performance of the PET. By having the second end 109A tapered and having a second tapered portion 1000 such that the second end 109A does not extend beyond the segment, any loss along the edges due to misalignment of the segmented light guide 110A and scintillator module 100C is reduced.

Typically, a misalignment between segmented light guide 110A and scintillator module 100C may be small, e.g., less than 1 mm. The angle of taper B is defined as the angle between a virtual line parallel to the longitudinal axis and extending along a wall or surface of the scintillator module (which is also parallel to the longitudinal axis) and the tapered wall (acute angle). Also, the starting point for the taper may also be close to the second end 109A. Furthermore, since the taper at the second end 109A is not directed to addressing unintended leakage between scintillator modules associated with different sensors 120 or pixels, the length of the second tapered portion 1000 may be shorter than the length of the first tapered portion 1005. Since the length of the second tapered portion 1000 may be shorted than the length of the first tapered portion 1005, the angle of taper B may be larger for the second tapered portion 1000 may angle of taper A for the first tapered portion 1005.

While the same scintillator module 100C may be tapered on the first end 107 and the second end 109A, the portion or wall that is tapered is offset. For example, as illustrated in FIG. 10, the scintillator modules 100C is tapered at the first end (first tapered portion 1005) on a wall or portion facing the boundary or edge of the active area 310. However, since the segments of the segmented light guide 110A is offset with the sensors 120 and contact scintillator modules in different (adjacent or neighboring) pixels, the walls or portions that are tapered for the second end 109A (second tapered 1000) is wall or portions not facing the boundary or edge of the active area 310 (e.g., inner facing walls or portions).

Figure 11:
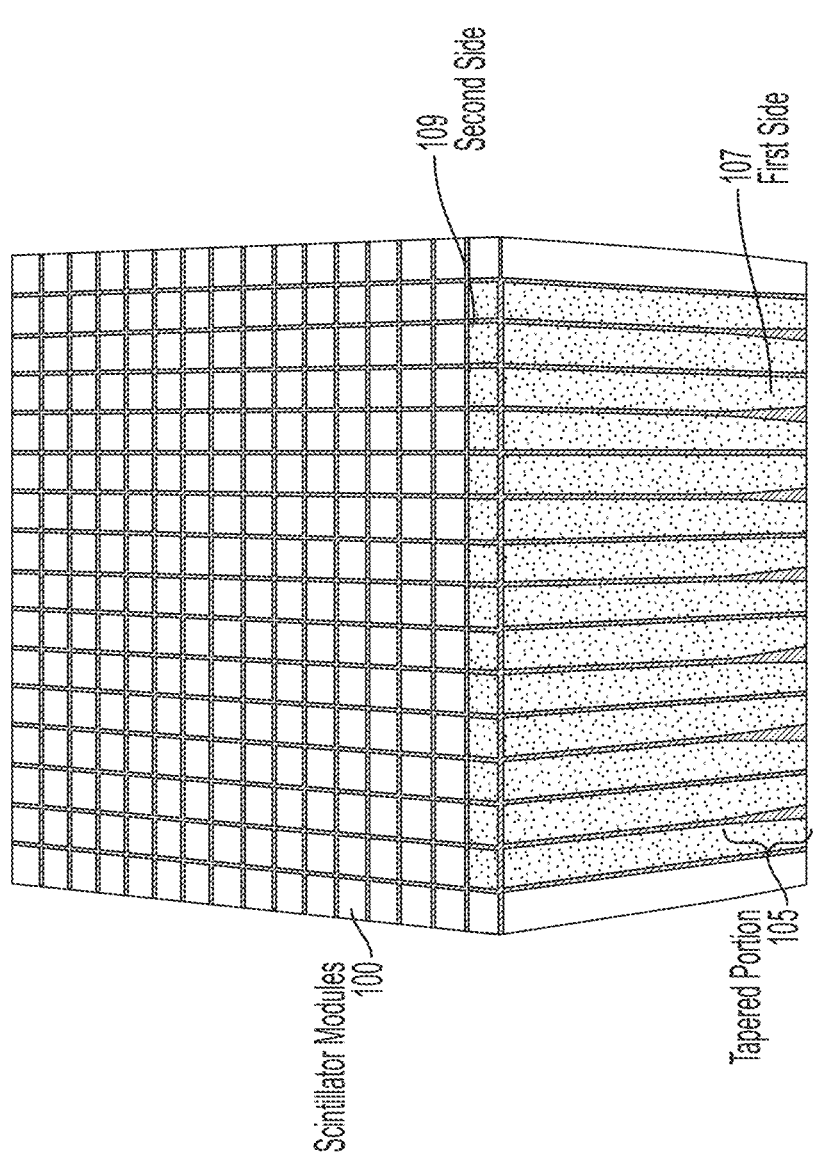
FIGS. 11-15 illustrate different views of scintillator modules fabricated in accordance with aspects of the disclosure having a tapered first end where there is a four-to-one scintillator module to optical sensor coupling, where FIGS. 14 and 15 also show the sensor array.
Figure 12:
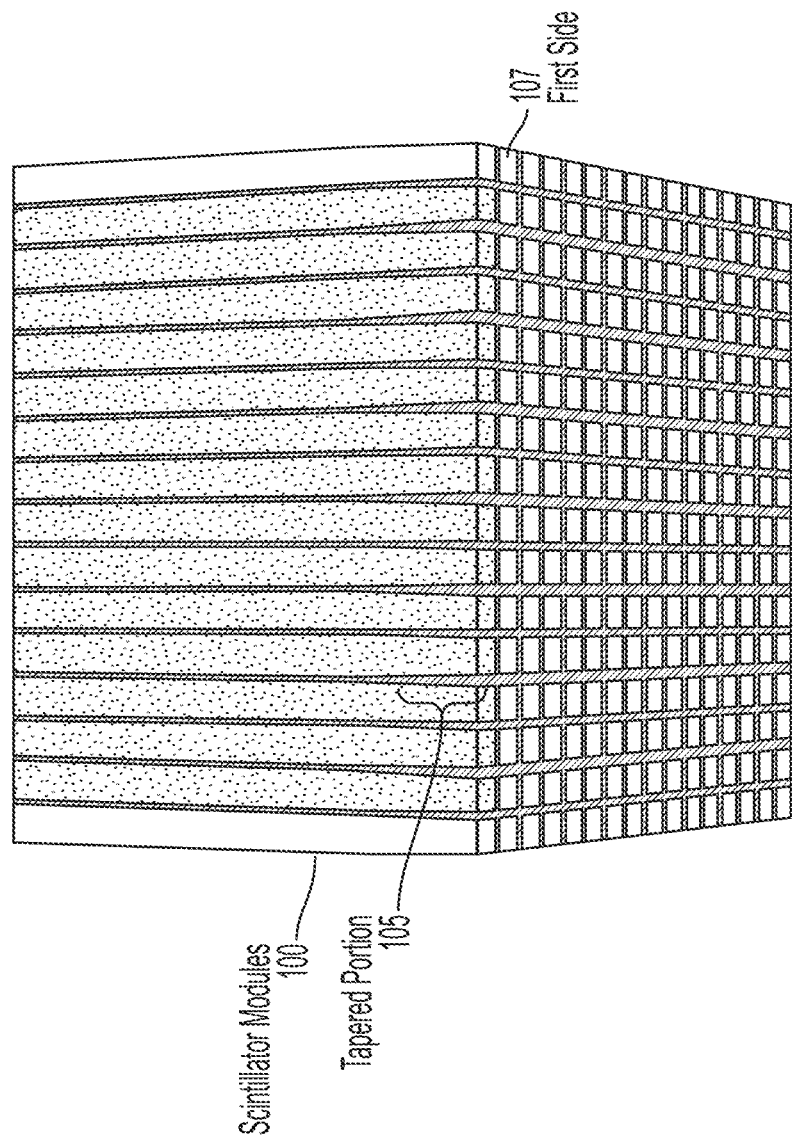

FIGS. 11-15 illustrate different views of scintillator modules fabricated in accordance with aspects of the disclosure having a tapered first end 107 where there is a four-to-one scintillator module to optical sensor coupling. In FIGS. 11 and 12, the scintillator modules are shown without the light guide or optical sensors (or reflector). As shown in FIGS. 11 and 12, the scintillator modules 100 are arranged in a 16×16 array (LYSO crystals). Each scintillating module 100 was designed to be about 20 mm in the longitudinal axis direction (z-direction). The second end 109 has designed to have a second cross sectional area about 1.5 mm×about 1.5 mm. The scintillator modules 100 had about this cross-sectional area until the tapering began. The tapering was designed to begin at about 5 mm away from the first end (scintillator module and optical sensor interface). The first cross sectional area was designed to be about 1.4×about 1.4 mm in order to minimize any overlap with the gap $G_D$ 119 and having the first end 107 stay within the active area 310. Tapering was only performed on the walls or portions facing the boundary or edge of the active area 310. The scintillator module gap $G_s$ 117 between adjacent scintillator modules was about 0.1 mm.

Figure 13:
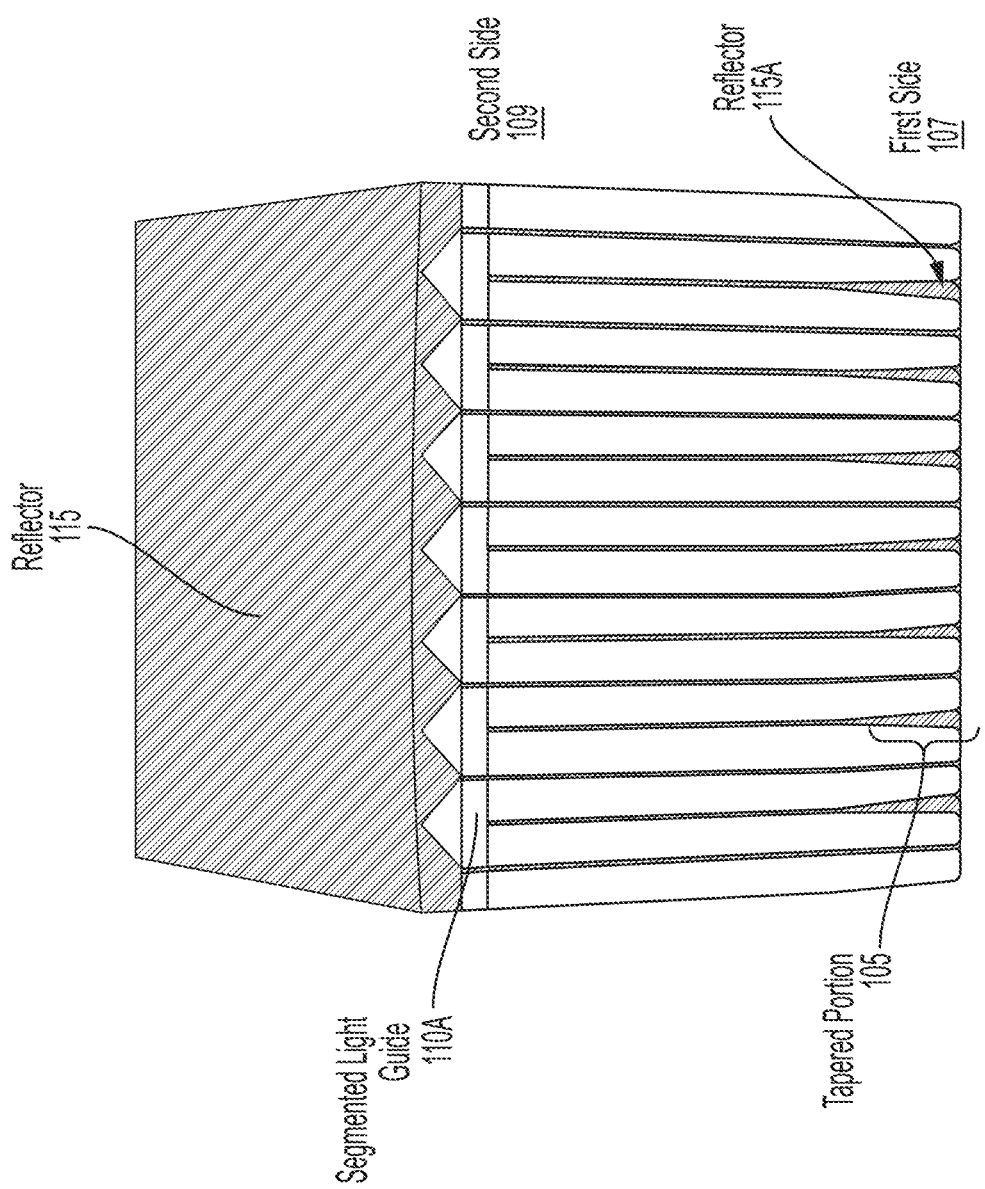

As shown in FIG. 13, the second end 109 is in contact with the segmented light guide 110A. In this case, the segmented light guide was a prismatoid light guide array (on the radiation receiving end). A reflector 115 is positioned on top of the segmented light guide 110A.

FIG. 14 illustrates the scintillator modules 100 prior to mounting to the optical sensors. As can be seen in FIG. 14, the space between scintillator modules associated with different pixels (sensors) at the first end 107 is larger than the scintillator module $G_S$ 117.

The optical sensor gap was about 0.2 mm. The active area was about 3.00 mm×about 3.00 mm. The pixel pitch was about 3.2×3.2 mm.

FIG. 15 shows the scintillator modules 100 in contact with the optical sensor array 300. The optical sensor array 300 is electrically coupled to a connector 1500. This connector 1500 is electrically coupled to a processor (not shown in FIG. 15). The processor is configured for DOI and TOF analysis. The processor execute one or more programs to determine the DOI and TOF.

Figure 16:
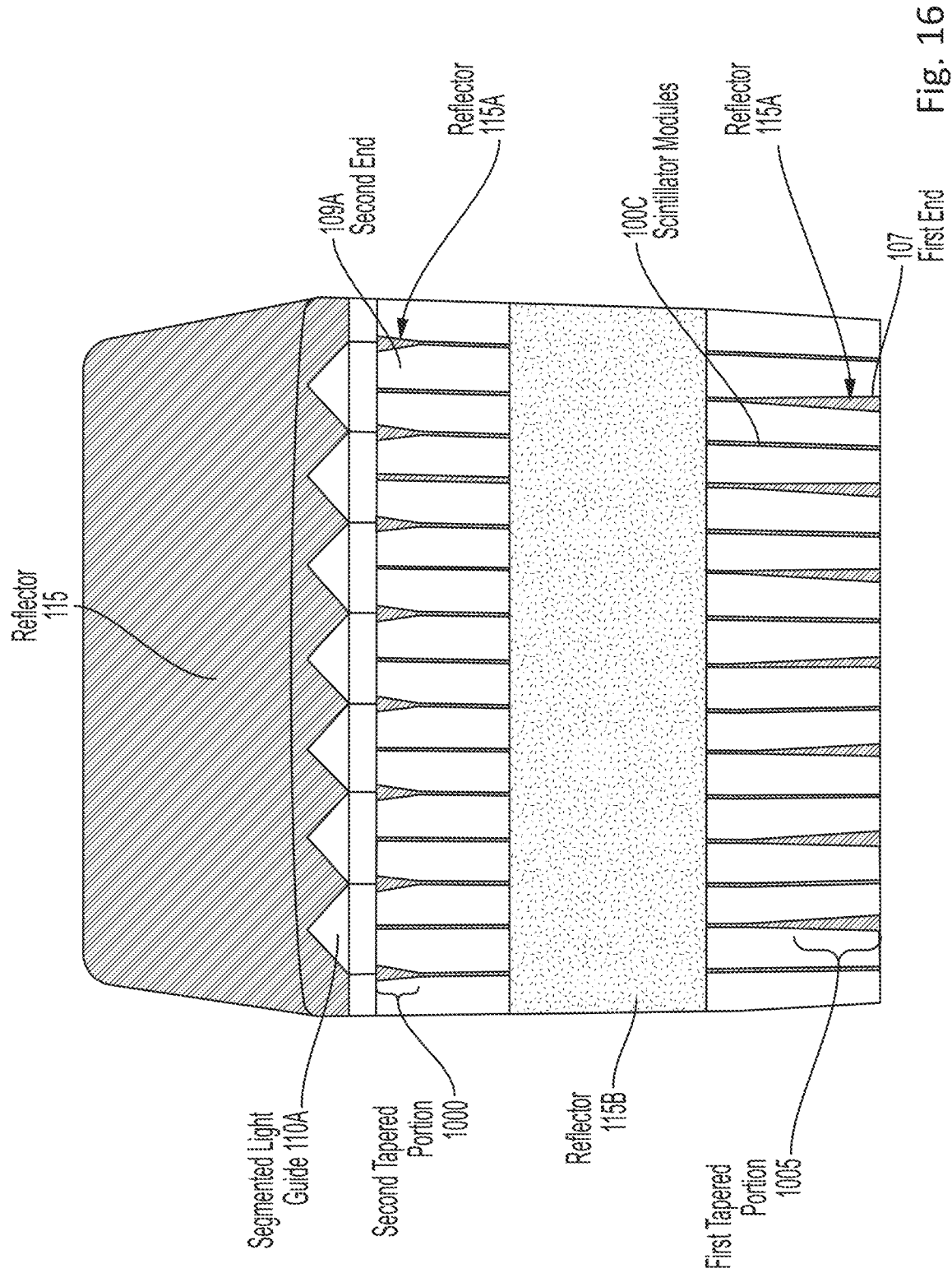
FIGS. 16 and 17 illustrate different views of other scintillator modules fabricated in accordance with aspects of the disclosure having certain scintillator modules tapered at the first end and the second end, where the side (portion) tapered is different in the first end and the second end where there is a four-to-one scintillator module to optical sensor coupling, where FIG. 17 also shows the sensor array.
Figure 17:
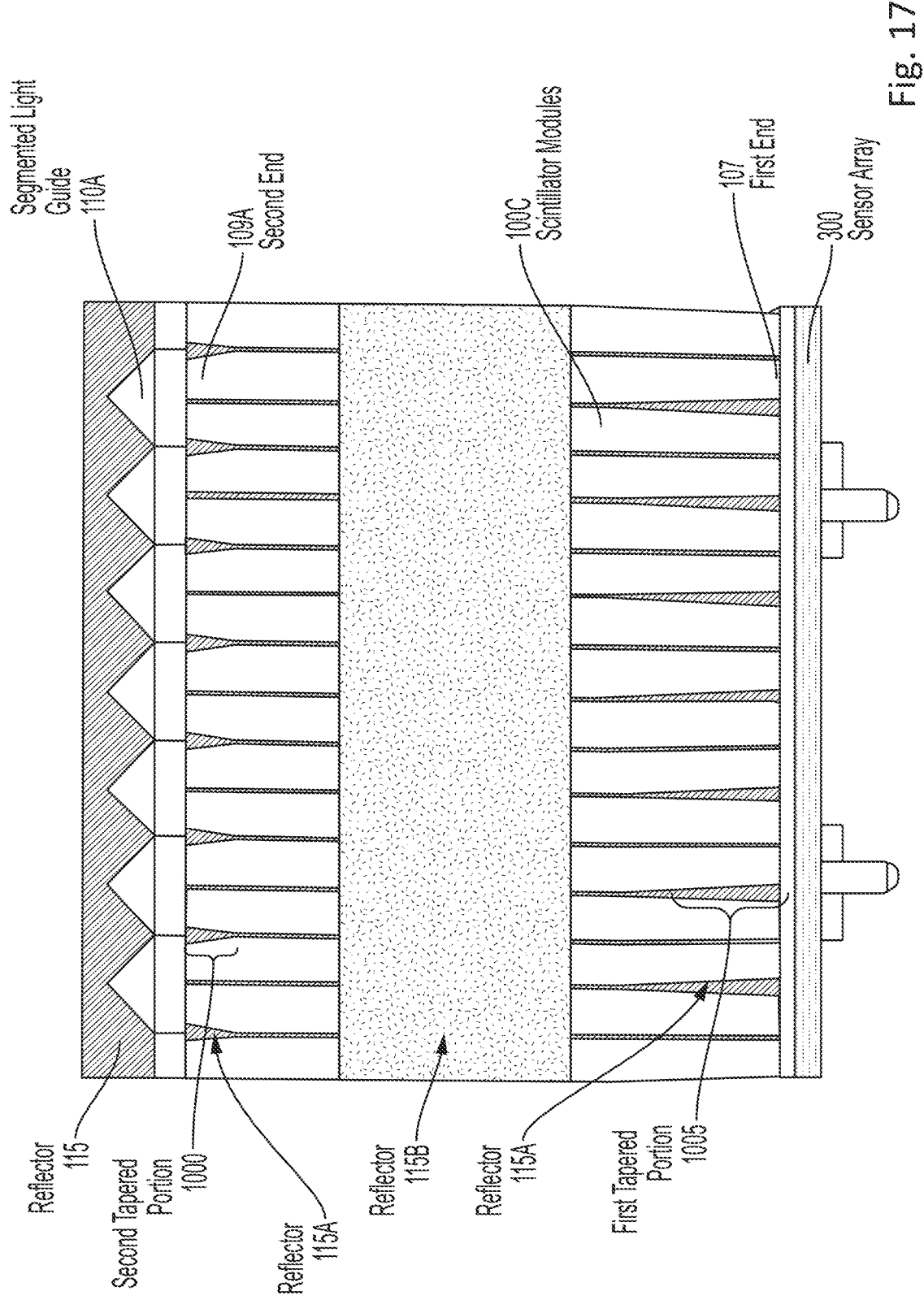

FIG. 16 and FIG. 17 are different views of scintillator modules fabricated in accordance with aspects of the disclosure having a tapered first end 107 and a tapered second end 109A where there is a four-to-one scintillator module to optical sensor coupling. As shown in FIGS. 16 and 17, the scintillating modules 100C have a first tapered portion 1005 and a second tapered portion 1000. The length of the second tapered portion 1000 in the longitudinal axis direction is smaller than the length of the first tapered portion 1005 in the longitudinal axis direction. Also, as shown in FIGS. 16 and 17, the wall or portion which is tapered for the first tapered portion 1005 and a second tapered portion 1000 are different (offset). The second cross section area was designed to be about 1.35 mm×1.35 mm. FIGS. 16 and 17 also show a reflector 115B wrapped around the outside of the scintillator modules 100 to prevent light leakage out of the corner and edge pixels. For illustrate purposes, the reflector 115B is only shown around a portion (center) of the scintillator modules 100 such that the modules may be seen. However, in operation, the reflector 115B would extend the entire longitudinal length of the scintillator modules (edge and corner modules).

Tapered the first end 107 of the scintillator modules 100 as described herein improves the correlation between TOF and DOI. A scintillator module array was fabricated as described herein to determine the correlation between the TOF and DOI. Depth-collimated data (flood histogram) at 19 different depths (1 mm-19 mm) was acquired in steps of 1 mm. A four-to-one scintillator module to optical sensor coupling was used. A 3 MBq Na-22 point source (1 mm active diameter) was placed in a lead cylinder with a 1 m diameter pin hole and positioned between the detection device as described herein and a reference scintillator array without tapered. The reference scintillator array had a 4-to-1 coupling with the SiPM. The scintillator module had dimensions of about 1.4 mm×about 1.4 mm×about 20 mm. The same SiPM was used for both. Two sides were tapered (boundary walls) as described above.

Barium sulfate ($BaSO_4$) was used to fill the intercrystal spaces and act as a diffuse reflector in the crystal arrays and light guides. All crystals were fully polished and the module was wrapped in black tape.

Light leak at the interface is random, whereas light shared within the segmented light guide (prismatoid) is deterministic.

Only coincidence events between the detection device in accordance with aspect of the disclosure and the reference were used for data analysis on order to reject Compton scatter. For example, only events where the highest signal was greater than twice the second highest signal were accepted. 10,000,000 events spread across all scintillator modules were acquired and used for analysis Photopeak filtering was performed an on per scintillator module bases with a 15% energy window.

Three different estimation parameter was used, one based on energy and two based on timing, for each event to explore the correlation between DOI and TOF.

Energy weighted average method was used for energy based DOI ($w_E$). we was calculated using the following equation:

$$w_E = \frac{P_m}{P} \quad (1)$$

where $w_E$ is the energy-weighted DOI parameter, $P_m$ is the maximum energy absorbed on a single SiPM pixel and P is the sum of all energies across all pixels.

The timing-based DOI ($w_{TOF}$) was calculated two different ways as following $$w_{TOF1} = t_{n1} - t_p \quad (2)$$

where $w_{TOF1}$ is the TOF-weighted DOI parameter using 1 timestamp, $t_{n1}$ is the first timestamp from an adjacent pixel to the primary pixel and $t_p$ is the timestamp from the primary pixel (i.e., primary timestamp). The adjacent pixel is one of the nearest-neighbor pixels coupled to the same light guide segment (same prismatoid light guide).

$$w_{TOF3} = \frac{(t_{n1} - t_p) + (t_{n2} - t_p) + (t_{n3} - t_p)}{3} \quad (3)$$

where $w_{TOF3}$ is the TOF-weighted DOI parameter with 3 timestamps, $t_{n1}$, $t_{n2}$ and $t_{n3}$ are the first, second and third timestamps from adjacent pixels, and $t_p$ is the primary timestamp. The 3 adjacent pixels are the nearest-neighbor pixels coupled to the same light guide segment (same prismatoid light guide).

Figure 18:
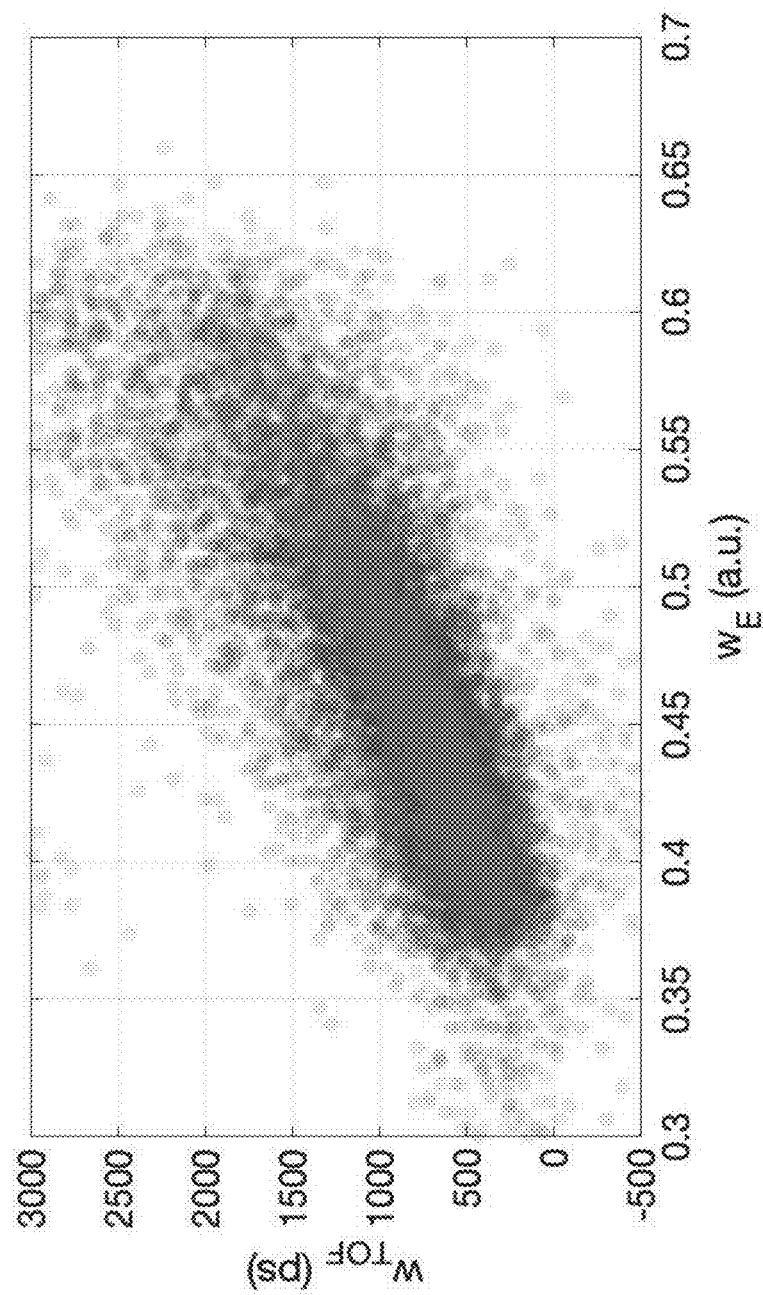
FIG. 18 illustrates a graph showing the correlation between depth-of-interaction and time-of-flight for two different timestamp methods.

FIG. 18 illustrates a graph showing the correlation between depth-of-interaction and time-of-flight for two different timestamp methods. The x-axis is the energy-based DOI estimation ($w_E$) in arbitrary units. The y-axis is the timing-based DOI (time of flight). There is a strong correlation between the energy based and the timing based estimations (using both timestamping, e.g., 1 and 3). The correlation between determinations using eq 1 and eq3 ($w_E$ and $w_{TOF3}$) was stronger than the correlation between determination using eq 1 and eq 2 ($w_E$ and $w_{TOF1}$). For example, $R^2=0.53$ for $w_E$ and $w_{TOF3}$ and the $R^2$ $w_E$ and $w_{TOF1}$ was 0.31.

FIGS. 19A-19C show estimation histograms based on five different depths taken at 2 mm, 6 mm, 10 mm, 14 mm and 18 mm. 0 mm represents the depth at the light guide and 20 mm represents the depth at the optical sensor array interface. For FIG. 19A, DOI was calculated using equation 1 per event ($w_e$). The frequency each ratio value was calculated is the count. The histograms were than plots. The ratio values were then converted into a depth in mm. The conversion may be determined based on the following equation:

$$DOI = m*w + q \quad (4)$$

where m is the slope between DOI and w, and q is the intercept, which ensures that DOI starts at 0 and w, is either $w_E$ (when plotting using equation 1), $w_{TOF1}$ (when plotting using equation 2) and $w_{TOF3}$ (when plotting using equation 3). This equation is based on a standard linear regression model. "m" and "q" in equation 4 may be different when used to determine the DOI from $w_E$, $w_{TOF1}$ and $w_{TOF3}$.

The range of the ratio is between 0 and 1. The 0 may be correlated to a depth of 20 mm and 1 may be correlated with a depth of 0 mm. The estimated DOI for each ground truth is shown inset in FIG. 19A, e.g., 2.5 mm for 2 mm, 2.1 mm for 6 mm, 2 mm for 10 mm, 2.1 mm for 14 mm and 2.4 mm for 18 mm (rounded to be nearest tenth).

The estimated DOI resolution for the scintillating modules with taper was 2.22 mm FWHM for the energy weighed method (FIG. 19A). The estimated DOI resolution was determined by averaging the estimated DOI for each ground truth. The DOI resolution for a reference scintillator array, e.g., a scintillator module without tapering was 2.5 mm FWHM.

For FIG. 19B, DOI was calculated using equation 2 per event ($w_{TOF1}$). The frequency each ratio value was calculated is the count. The histograms were than plots. The ratio values were then converted into a depth in mm. The conversion may be determined based on equation 4. The estimated DOI for each ground truth is shown inset in FIG. 19B, e.g., 6.1 mm for 2 mm, 9.4 mm for 6 mm, 9 mm for 10 mm, 6.6 mm for 14 mm and 5.6 mm for 18 mm) (rounded to be nearest tenth). The estimated DOI resolution for the scintillator modules with taper using $w_{TOF1}$ was 7.38 mm. The estimated DOI resolution was determined by averaging the estimated DOI for each ground truth.

For FIG. 19C, DOI was calculated using equation 3 per event ($w_{TOF3}$). The frequency each ratio value was calculated is the count. The histograms were than plots. The ratio values were then converted into a depth in mm. The conversion may be determined based on equation 4. The estimated DOI for each ground truth is shown inset in FIG. 19B, e.g. 5.9 mm for 2 mm, 5.8 mm for 6 mm, 5.5 mm for 10 mm, 5.1 mm for 14 mm and 4.6 mm for 18 mm (rounded to be nearest tenth). The estimated DOI resolution for the scintillator modules with taper using $w_{TOF3}$ was 5.38 mm The estimated DOI resolution was determined by averaging the estimated DOI for each ground truth.

The coefficients in equation 4 may be different for each FIGS. 19A-19C.

In the discussion and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein. For example, the term about when used for a measurement in mm, may include+/0.1, 0.2, 0.3, etc., where the difference between the stated number may be larger when the state number is larger. For example, about 1.5 may include 1.2-1.8, where about 20, may include 19.0-21.0.

As used herein, the term "substantially", or "substantial", is equally applicable when used in a negative connotation to refer to the complete or near complete lack of an action, characteristic, property, state, structure, item, or result. For example, a surface that is "substantially" flat would either completely flat, or so nearly flat that the effect would be the same as if it were completely flat. "Substantially" when referring to a shape or size may account for manufacturing where a perfect shapes, such as circular or sizes may be difficult to manufacture.

As used herein terms such as "a", "an" and "the" are not intended to refer to only a singular entity, but include the general class of which a specific example may be used for illustration. As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described. For purposes of the description hereinafter, the terms "upper", "lower", "right", "left", "vertical", "horizontal", "top", "bottom", and derivatives thereof shall relate to a device relative to a floor and/or as it is oriented in the figures.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually. For example, a single FPGA may be used or multiple FPGAs may be used to achieve the functions, features or instructions described herein. For example, multiple processors may allow load balancing. In a further example, a server (also known as remote, or cloud) processor may accomplish some or all functionality on behalf of a client processor.

As used herein, the term "processor" or the term "controller" may be replaced with the term "circuit" such as an ASIC. The term "processor" may refer to, be part of, or include processor hardware (shared, dedicated, or group) that executes code and memory hardware (shared, dedicated, or group) that stores code executed by the processor.

Further, in some aspect of the disclosure, a non-transitory computer-readable storage medium comprising electronically readable control information stored thereon, configured in such that when the storage medium is used in a processor, aspects of the functionality described herein is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term memory hardware is a subset of the term computer-readable medium.

The described aspects and examples of the present disclosure are intended to be illustrative rather than restrictive, and are not intended to represent every aspect or example of the present disclosure. While the fundamental novel features of the disclosure as applied to various specific aspects thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or aspects of the disclosure may be incorporated in any other disclosed or described or suggested form or aspects as a general matter of design choice. Further, various modifications and variations can be made without departing from the spirit or scope of the disclosure as set forth in the following claims both literally and in equivalents recognized in law.

What is claimed is:

1. A particle detection device comprising:
   an array of optical sensors arranged in a 2-dimensional array, where there is a first gap between adjacent optical sensors, each optical sensor corresponding to a pixel and has an active area;
   a plurality of scintillator modules, where at least one scintillator module corresponds with an optical sensor in the array of optical sensor, respectively, each scintillator module has a first end in contact with its corresponding optical sensor and a second end, where there is a second gap between adjacent scintillator modules, the second gap being a minimum gap between the adjacent scintillator modules, and where scintillator modules adjacent a boundary of the active area of a corresponding optical sensor have a tapered portion at the first end such that a first cross sectional area at the first end overlaps the active area as viewed along a direction of a longitudinal axis, where the first cross sectional area is orthogonal to the longitudinal axis,
   a segmented light guide in contact with the second end of each scintillator module; and
   wherein the second gap is smaller than the first gap.

2. The particle detection device of claim 1, wherein a second cross sectional area at the second end is larger than the first cross sectional area, where the second cross sectional area is orthogonal to the longitudinal axis.

3. The particle detection device of claim 2, wherein at least a portion of the second cross section area at the second end overlaps the first gap as viewed along the direction of the longitudinal axis.

4. The particle detection device of claim 1, wherein the first cross sectional area has a substantially circular shape.

5. The particle detection device of claim 1, wherein the at least one scintillator module is one scintillator module such that there is a one-to-one correspondence between the scintillator module and the optical sensor, where the first cross sectional area of each scintillator module is rectangular and all four sides at the first end are tapered.

6. The particle detection device of claim 1, wherein the at least one scintillator module comprises four scintillator modules such that there is a four-to-one correspondence between the scintillator modules and the optical sensor, where the first cross sectional area of each scintillator module is defined by a plurality of sides and, where at least two sides of the scintillator module facing a respective boundary of the active area are tapered at the first end.

7. The particle detection device of claim 6, wherein only sides of the scintillator module facing a respective boundary of the active area are tapered at the first end.

8. The particle detection device of claim 1, wherein the tapered portion has a tapered length in a direction parallel to the longitudinal axis, where the tapered length is less than a third of length from the first end and the second end in the direction parallel to the longitudinal axis.

9. The particle detection device of claim 8, wherein the tapered length is about the same for each scintillator module having the tapered portion.

10. The particle detection device of claim 1, wherein a length from the first end to the second end is about 20 mm and a tapered length is about 5 mm.

11. The particle detection device of claim 10, wherein a second cross sectional area is about 1.5 mm×about 1.5 mm and the first cross section area is about 1.4 mm×about 1.4 mm.

12. The particle detection device of claim 11, wherein the active area is about 3.0 mm× about 3.0 mm.

13. The particle detection device of claim 1, wherein the segmented light guide comprises a plurality of prismatoids, each prismatoid configured to redirect particles of radiation between the second ends of the scintillator modules.

14. The particle detection device of claim 1, further comprising a reflector positioned on the segmented light guide and between segments of the segmented light guide.

15. The particle detection device of claim 1, further comprising a reflector positioned between each scintillator module including in a space between the tapered portion and another scintillator module.

16. The particle detection device of claim 1, wherein the second end has a second tapered portion.

17. The particle detection device of claim 16, wherein the second tapered portion has a taper length in a longitudinal direction and the taper length is smaller than the taper length of the tapered portion in the longitudinal direction.

18. The particle detection device of claim 1, wherein segments of the segmented light guide are offset with the optical sensors such that a first scintillator module in contact with a first optical sensor and a second scintillator module in contact with a second optical sensor are in contact with a same segment.

19. The particle detection device of claim 18, wherein a side of a scintillator module tapered at the second end is different from a side of the scintillator module tapered at the first end.

20. A particle detection device comprising:
an array of optical sensors arranged in a 2-dimensional array, where there is a first gap between adjacent optical sensors, each optical sensor corresponding to a pixel and has an active area;
a plurality of scintillator modules corresponding with each optical sensor in the array of optical sensors, respectively, each scintillator module has a first end in contact with its corresponding optical sensor and a second end, where there is a second gap between adjacent scintillator modules, the second gap being a minimum gap between the adjacent scintillator modules; and
a segmented light guide in contact with the second end of each scintillator module,
wherein at least a subset of the plurality of scintillator modules corresponding with each optical sensor have a tapered portion at the first end, where the location of the tapered portion depends on a relative location of the scintillator modules within the active area and a respective boundary of the active area, wherein the second gap is smaller than the first gap.

21. The particle detection device of claim 20, wherein the scintillator modules located at a corner of the active area have at least two sides tapered at the first end such that a first cross sectional area at the first end overlaps the active area as viewed along a direction of a longitudinal axis, where the first cross sectional area is orthogonal to the longitudinal axis.

22. The particle detection device of claim 21, wherein only the two sides of a scintillator module located at the corner of the active area are tapered at the first end.

23. The particle detection device of claim 22, wherein the scintillator modules located between other scintillator modules which are located at the corner of the active area and aligned only have one side tapered at the first end such that the first cross sectional area at the first end overlaps the active area as viewed along the direction of the longitudinal axis, the one side facing a boundary of the active area.

24. The particle detection device of claim 23, wherein scintillator modules having other scintillator modules which are located between the scintillator modules and a boundary of the active area do not have the tapered portion at the first end.

25. The particle detection device of claim 20, further comprising a reflector positioned between each scintillator module including in a space between the tapered portion and another scintillator module.

* * * * *